(12) United States Patent
Judge et al.

(10) Patent No.: US 7,693,947 B2
(45) Date of Patent: Apr. 6, 2010

(54) SYSTEMS AND METHODS FOR GRAPHICALLY DISPLAYING MESSAGING TRAFFIC

(75) Inventors: Paul Judge, Alpharetta, GA (US);
Dmitri Alperovitch, Atlanta, GA (US);
Sven Krasser, Atlanta, GA (US);
Arasendran Sellakannu, Marietta, GA (US); Lamar Lorenzo Willis, Woodstock, GA (US)

(73) Assignee: McAfee, Inc., Santa Clara, CA (US)

( * ) Notice: Subject to any disclaimer, the term of this patent is extended or adjusted under 35 U.S.C. 154(b) by 572 days.

(21) Appl. No.: 11/423,308

(22) Filed: Jun. 9, 2006

(65) Prior Publication Data

US 2006/0267802 A1 Nov. 30, 2006

Related U.S. Application Data

(63) Continuation-in-part of application No. 11/173,941, filed on Jul. 1, 2005, which is a continuation-in-part of application No. 11/142,943, filed on Jun. 2, 2005, application No. 11/423,308, filed on Jun. 9, 2006, which is a continuation-in-part of application No. 11/383,347, filed on May 15, 2006, application No. 11/423,308, filed on Jun. 9, 2006, which is a continuation-in-part of application No. 11/218,689, filed on Sep. 2, 2005, now Pat. No. 7,089,590, which is a continuation of application No. 10/093,553, filed on Mar. 8, 2002, now Pat. No. 6,941,467, application No. 11/423,308, filed on Jun. 9, 2006, which is a continuation-in-part of application No. 10/094,211, filed on Mar. 8, 2002, and a continuation-in-part of application No. 10/094,266, filed on Mar. 8, 2002, now Pat. No. 7,124,438, and a continuation-in-part of application No. 10/361,091, filed on Feb. 7, 2003, now Pat. No. 7,096,498, and a continuation-in-part of application No. 10/373,325, filed on Feb. 24, 2003, now Pat. No. 7,213,260, and a continuation-in-part of application No. 10/361,067, filed on Feb. 7, 2003, now abandoned, and a continuation-in-part of application No. 10/384,924, filed on Mar. 6, 2003.

(60) Provisional application No. 60/625,507, filed on Nov. 5, 2004, provisional application No. 60/736,121, filed on Nov. 10, 2005.

(51) Int. Cl.
*G06F 15/16* (2006.01)
*G06F 15/173* (2006.01)

(52) U.S. Cl. ..................................... 709/206; 709/224

(58) Field of Classification Search ......... 370/352–356; 709/206, 223, 234, 224–227; 715/734–737, 715/853; 345/418, 440, 441; 340/973
See application file for complete search history.

(56) References Cited

U.S. PATENT DOCUMENTS 4,289,930 A     9/1981   Connolly et al.

(Continued)

FOREIGN PATENT DOCUMENTS

CA     2564533     12/2005

(Continued)

OTHER PUBLICATIONS

Article entitled "An Example-Based Mapping Method for Text Categorization and Retrieval" by Yang et. al., in *ACM Transactions on Information Systems*, Jul. 1994, vol. 12, No. 3, pp. 252-277.

(Continued)

*Primary Examiner*—William J Deane
*Assistant Examiner*—Sonia Gay
(74) *Attorney, Agent, or Firm*—Fish & Richardson P.C.

(57) ABSTRACT

Systems and methods for graphically displaying messaging traffic flows by collecting messaging data, converting a portion of the messaging data to a geographical position and collecting statistics related to the messaging data for overlaying upon a geographical map.

28 Claims, 14 Drawing Sheets

U.S. PATENT DOCUMENTS

| | | | |
|---|---|---|---|
| 4,384,325 A | 5/1983 | Slechta et al. | |
| 4,386,416 A | 5/1983 | Giltner et al. | |
| 4,532,588 A | 7/1985 | Foster | |
| 4,713,780 A | 12/1987 | Schultz et al. | |
| 4,754,428 A | 6/1988 | Schultz et al. | |
| 4,837,798 A | 6/1989 | Cohen et al. | |
| 4,853,961 A | 8/1989 | Pastor | |
| 4,864,573 A | 9/1989 | Horsten | |
| 4,951,196 A | 8/1990 | Jackson | |
| 4,975,950 A | 12/1990 | Lentz | |
| 4,979,210 A | 12/1990 | Nagata et al. | |
| 5,008,814 A | 4/1991 | Mathur | |
| 5,020,059 A | 5/1991 | Gorin et al. | |
| 5,051,886 A | 9/1991 | Kawaguchi et al. | |
| 5,054,096 A | 10/1991 | Beizer | |
| 5,105,184 A | 4/1992 | Pirani et al. | |
| 5,119,465 A | 6/1992 | Jack et al. | |
| 5,136,690 A * | 8/1992 | Becker et al. | 715/853 |
| 5,144,557 A | 9/1992 | Wang | |
| 5,144,659 A | 9/1992 | Jones | |
| 5,144,660 A | 9/1992 | Rose | |
| 5,167,011 A | 11/1992 | Priest | |
| 5,210,824 A | 5/1993 | Putz et al. | |
| 5,210,825 A | 5/1993 | Kavaler | |
| 5,235,642 A | 8/1993 | Wobber et al. | |
| 5,239,466 A | 8/1993 | Morgan et al. | |
| 5,247,661 A | 9/1993 | Hager et al. | |
| 5,276,869 A | 1/1994 | Forrest et al. | |
| 5,278,901 A | 1/1994 | Shieh et al. | |
| 5,283,887 A | 2/1994 | Zachery | |
| 5,293,250 A | 3/1994 | Okumura et al. | |
| 5,313,521 A | 5/1994 | Torii et al. | |
| 5,319,776 A | 6/1994 | Hile et al. | |
| 5,355,472 A | 10/1994 | Lewis | |
| 5,367,621 A | 11/1994 | Cohen et al. | |
| 5,377,354 A | 12/1994 | Scannell et al. | |
| 5,379,340 A | 1/1995 | Overend et al. | |
| 5,379,374 A | 1/1995 | Ishizaki et al. | |
| 5,404,231 A | 4/1995 | Bloomfield | |
| 5,406,557 A | 4/1995 | Baudoin | |
| 5,414,833 A | 5/1995 | Hershey et al. | |
| 5,416,842 A | 5/1995 | Aziz | |
| 5,418,908 A | 5/1995 | Keller et al. | |
| 5,424,724 A | 6/1995 | Williams et al. | |
| 5,479,411 A | 12/1995 | Klein | |
| 5,481,312 A | 1/1996 | Cash et al. | |
| 5,483,466 A | 1/1996 | Kawahara et al. | |
| 5,485,409 A | 1/1996 | Gupta et al. | |
| 5,495,610 A | 2/1996 | Shing et al. | |
| 5,509,074 A | 4/1996 | Choudhury et al. | |
| 5,511,122 A | 4/1996 | Atkinson | |
| 5,513,126 A | 4/1996 | Harkins et al. | |
| 5,513,323 A | 4/1996 | Williams et al. | |
| 5,530,852 A | 6/1996 | Meske, Jr. et al. | |
| 5,535,276 A | 7/1996 | Ganesan | |
| 5,541,993 A | 7/1996 | Fan et al. | |
| 5,544,320 A | 8/1996 | Konrad | |
| 5,550,984 A | 8/1996 | Gelb | |
| 5,550,994 A | 8/1996 | Tashiro et al. | |
| 5,557,742 A | 9/1996 | Smaha et al. | |
| 5,572,643 A | 11/1996 | Judson | |
| 5,577,209 A | 11/1996 | Boyle et al. | |
| 5,602,918 A | 2/1997 | Chen et al. | |
| 5,606,668 A | 2/1997 | Shwed | |
| 5,608,819 A | 3/1997 | Ikeuchi | |
| 5,608,874 A | 3/1997 | Ogawa et al. | |
| 5,619,648 A | 4/1997 | Canale et al. | |
| 5,632,011 A | 5/1997 | Landfield et al. | |
| 5,638,487 A | 6/1997 | Chigier | |
| 5,644,404 A | 7/1997 | Hashimoto et al. | |
| 5,657,461 A | 8/1997 | Harkins et al. | |
| 5,673,322 A | 9/1997 | Pepe et al. | |
| 5,675,507 A | 10/1997 | Bobo, II | |
| 5,675,733 A | 10/1997 | Williams | |
| 5,677,955 A | 10/1997 | Doggett et al. | |
| 5,694,616 A | 12/1997 | Johnson et al. | |
| 5,696,822 A | 12/1997 | Nachenberg | |
| 5,706,442 A | 1/1998 | Anderson et al. | |
| 5,708,780 A | 1/1998 | Levergood et al. | |
| 5,708,826 A | 1/1998 | Ikeda et al. | |
| 5,710,883 A | 1/1998 | Hong et al. | |
| 5,727,156 A | 3/1998 | Herr-Hoyman et al. | |
| 5,740,231 A | 4/1998 | Cohn et al. | |
| 5,742,759 A | 4/1998 | Nessett et al. | |
| 5,742,769 A | 4/1998 | Lee et al. | |
| 5,745,574 A | 4/1998 | Muftic | |
| 5,751,956 A | 5/1998 | Kirsch | |
| 5,758,343 A | 5/1998 | Vigil et al. | |
| 5,764,906 A | 6/1998 | Edelstein et al. | |
| 5,768,528 A | 6/1998 | Stumm | |
| 5,768,552 A * | 6/1998 | Jacoby | 345/441 |
| 5,771,348 A | 6/1998 | Kubatzki et al. | |
| 5,778,372 A | 7/1998 | Cordell et al. | |
| 5,781,857 A | 7/1998 | Hwang et al. | |
| 5,781,901 A | 7/1998 | Kuzma | |
| 5,790,789 A | 8/1998 | Suarez | |
| 5,790,790 A | 8/1998 | Smith et al. | |
| 5,790,793 A | 8/1998 | Higley | |
| 5,793,763 A | 8/1998 | Mayes et al. | |
| 5,793,972 A | 8/1998 | Shane | |
| 5,796,942 A | 8/1998 | Esbensen | |
| 5,796,948 A | 8/1998 | Cohen | |
| 5,801,700 A | 9/1998 | Ferguson | |
| 5,805,719 A | 9/1998 | Pare, Jr. et al. | |
| 5,812,398 A | 9/1998 | Nielsen | |
| 5,812,776 A | 9/1998 | Gifford | |
| 5,822,526 A | 10/1998 | Waskiewicz | |
| 5,822,527 A | 10/1998 | Post | |
| 5,826,013 A | 10/1998 | Nachenberg | |
| 5,826,014 A | 10/1998 | Coley et al. | |
| 5,826,022 A | 10/1998 | Nielsen | |
| 5,826,029 A | 10/1998 | Gore, Jr. et al. | |
| 5,835,087 A | 11/1998 | Herz et al. | |
| 5,845,084 A | 12/1998 | Cordell et al. | |
| 5,850,442 A | 12/1998 | Muftic | |
| 5,855,020 A | 12/1998 | Kirsch | |
| 5,860,068 A | 1/1999 | Cook | |
| 5,862,325 A | 1/1999 | Reed et al. | |
| 5,864,852 A | 1/1999 | Luotonen | |
| 5,878,230 A | 3/1999 | Weber et al. | |
| 5,884,033 A | 3/1999 | Duvall et al. | |
| 5,892,825 A | 4/1999 | Mages et al. | |
| 5,893,114 A | 4/1999 | Hashimoto et al. | |
| 5,896,499 A | 4/1999 | McKelvey | |
| 5,898,836 A | 4/1999 | Freivald et al. | |
| 5,903,723 A | 5/1999 | Becker et al. | |
| 5,911,776 A | 6/1999 | Guck | |
| 5,923,846 A | 7/1999 | Gage et al. | |
| 5,930,479 A | 7/1999 | Hall | |
| 5,933,478 A | 8/1999 | Ozaki et al. | |
| 5,933,498 A | 8/1999 | Schneck et al. | |
| 5,937,164 A | 8/1999 | Mages et al. | |
| 5,940,591 A | 8/1999 | Boyle et al. | |
| 5,948,062 A | 9/1999 | Tzelnic et al. | |
| 5,958,005 A | 9/1999 | Thorne et al. | |
| 5,963,915 A | 10/1999 | Kirsch | |
| 5,978,799 A | 11/1999 | Hirsch | |
| 5,987,609 A | 11/1999 | Hasebe | |
| 5,991,881 A | 11/1999 | Conklin et al. | |
| 5,999,932 A | 12/1999 | Paul | |
| 6,003,027 A | 12/1999 | Prager | |
| 6,006,329 A | 12/1999 | Chi | |
| 6,012,144 A | 1/2000 | Pickett | |
| 6,014,651 A | 1/2000 | Crawford | |

| | | | | | | | |
|---|---|---|---|---|---|---|---|
| 6,023,723 | A | 2/2000 | McCormick et al. | 6,487,666 | B1 | 11/2002 | Shanklin et al. |
| 6,029,256 | A | 2/2000 | Kouznetsov | 6,502,191 | B1 | 12/2002 | Smith et al. |
| 6,035,423 | A | 3/2000 | Hodges et al. | 6,516,411 | B2 | 2/2003 | Smith |
| 6,052,709 | A | 4/2000 | Paul | 6,519,703 | B1 | 2/2003 | Joyce |
| 6,058,381 | A | 5/2000 | Nelson | 6,539,430 | B1 | 3/2003 | Humes |
| 6,058,482 | A | 5/2000 | Liu | 6,546,416 | B1 | 4/2003 | Kirsch |
| 6,061,448 | A | 5/2000 | Smith et al. | 6,546,493 | B1 | 4/2003 | Magdych et al. |
| 6,061,722 | A | 5/2000 | Lipa et al. | 6,550,012 | B1 | 4/2003 | Villa et al. |
| 6,072,942 | A | 6/2000 | Stockwell et al. | 6,574,737 | B1 | 6/2003 | Kingsford et al. |
| 6,092,114 | A | 7/2000 | Shaffer et al. | 6,578,025 | B1 | 6/2003 | Pollack et al. |
| 6,092,194 | A | 7/2000 | Touboul | 6,609,196 | B1 | 8/2003 | Dickinson, III et al. |
| 6,094,277 | A | 7/2000 | Toyoda | 6,650,890 | B1 | 11/2003 | Iriam et al. |
| 6,094,731 | A | 7/2000 | Waldin et al. | 6,654,787 | B1 | 11/2003 | Aronson et al. |
| 6,104,500 | A | 8/2000 | Alam et al. | 6,661,353 | B1 * | 12/2003 | Gopen ........................ 340/973 |
| 6,108,688 | A | 8/2000 | Nielsen | 6,675,153 | B1 | 1/2004 | Cook et al. |
| 6,108,691 | A | 8/2000 | Lee et al. | 6,681,331 | B1 | 1/2004 | Munson et al. |
| 6,108,786 | A | 8/2000 | Knowlson | 6,687,687 | B1 | 2/2004 | Smadja |
| 6,118,856 | A | 9/2000 | Paarsmarkt et al. | 6,697,950 | B1 | 2/2004 | Kouznetsov |
| 6,119,137 | A | 9/2000 | Smith et al. | 6,701,440 | B1 | 3/2004 | Kim et al. |
| 6,119,142 | A | 9/2000 | Kosaka | 6,704,874 | B1 | 3/2004 | Porras et al. |
| 6,119,230 | A | 9/2000 | Carter | 6,711,127 | B1 | 3/2004 | Gorman et al. |
| 6,119,236 | A | 9/2000 | Shipley | 6,725,377 | B1 | 4/2004 | Kouznetsov |
| 6,122,661 | A | 9/2000 | Stedman et al. | 6,732,101 | B1 | 5/2004 | Cook |
| 6,141,695 | A | 10/2000 | Sekiguchi et al. | 6,732,157 | B1 | 5/2004 | Gordon et al. |
| 6,141,778 | A | 10/2000 | Kane et al. | 6,735,703 | B1 | 5/2004 | Kilpatrick et al. |
| 6,145,083 | A | 11/2000 | Shaffer et al. | 6,738,462 | B1 | 5/2004 | Brunson |
| 6,151,675 | A | 11/2000 | Smith | 6,742,124 | B1 | 5/2004 | Kilpatrick et al. |
| 6,161,130 | A | 12/2000 | Horvitz et al. | 6,742,128 | B1 | 5/2004 | Joiner |
| 6,185,689 | B1 | 2/2001 | Todd, Sr. et al. | 6,754,705 | B2 | 6/2004 | Joiner et al. |
| 6,192,407 | B1 | 2/2001 | Smith et al. | 6,757,830 | B1 | 6/2004 | Tarbotton et al. |
| 6,199,102 | B1 | 3/2001 | Cobb | 6,768,991 | B2 | 7/2004 | Hearnden |
| 6,202,157 | B1 | 3/2001 | Brownlie et al. | 6,769,016 | B2 | 7/2004 | Rothwell et al. |
| 6,219,714 | B1 | 4/2001 | Inhwan et al. | 6,775,657 | B1 | 8/2004 | Baker |
| 6,223,213 | B1 | 4/2001 | Cleron et al. | 6,792,546 | B1 | 9/2004 | Shanklin et al. |
| 6,249,575 | B1 | 6/2001 | Heilmann et al. | 6,892,178 | B1 | 5/2005 | Zacharia |
| 6,249,807 | B1 | 6/2001 | Shaw et al. | 6,892,179 | B1 | 5/2005 | Zacharia |
| 6,260,043 | B1 | 7/2001 | Puri et al. | 6,892,237 | B1 | 5/2005 | Gai et al. |
| 6,269,447 | B1 | 7/2001 | Maloney et al. | 6,895,385 | B1 | 5/2005 | Zacharia et al. |
| 6,269,456 | B1 | 7/2001 | Hodges et al. | 6,895,438 | B1 * | 5/2005 | Ulrich ........................ 709/227 |
| 6,272,532 | B1 | 8/2001 | Feinleib | 6,907,430 | B2 | 6/2005 | Chong et al. |
| 6,275,942 | B1 | 8/2001 | Bernhard et al. | 6,910,135 | B1 | 6/2005 | Grainger |
| 6,279,113 | B1 | 8/2001 | Vaidya | 6,928,556 | B2 | 8/2005 | Black et al. |
| 6,279,133 | B1 | 8/2001 | Vafai et al. | 6,941,348 | B2 | 9/2005 | Petry et al. |
| 6,282,565 | B1 | 8/2001 | Shaw et al. | 6,941,467 | B2 | 9/2005 | Judge et al. |
| 6,285,991 | B1 | 9/2001 | Powar | 6,968,461 | B1 | 11/2005 | Lucas et al. |
| 6,289,214 | B1 | 9/2001 | Backstrom | 2001/0049793 | A1 | 12/2001 | Sugimoto |
| 6,298,445 | B1 | 10/2001 | Shostack et al. | 2002/0004902 | A1 | 1/2002 | Toh et al. |
| 6,301,668 | B1 | 10/2001 | Gleichauf et al. | 2002/0016910 | A1 | 2/2002 | Wright et al. |
| 6,304,898 | B1 | 10/2001 | Shiigi | 2002/0023140 | A1 | 2/2002 | Hile et al. |
| 6,304,973 | B1 | 10/2001 | Williams | 2002/0026591 | A1 | 2/2002 | Hartley et al. |
| 6,311,207 | B1 | 10/2001 | Mighdoll et al. | 2002/0032871 | A1 | 3/2002 | Malan et al. |
| 6,317,829 | B1 | 11/2001 | Van Oorschot | 2002/0035683 | A1 | 3/2002 | Kaashoek et al. |
| 6,320,948 | B1 | 11/2001 | Heilmann et al. | 2002/0042876 | A1 | 4/2002 | Smith |
| 6,321,267 | B1 | 11/2001 | Donaldson | 2002/0046041 | A1 | 4/2002 | Lang |
| 6,324,569 | B1 | 11/2001 | Ogilvie et al. | 2002/0049853 | A1 | 4/2002 | Chu et al. |
| 6,324,647 | B1 | 11/2001 | Bowman-Amuah | 2002/0078382 | A1 | 6/2002 | Sheikh et al. |
| 6,324,656 | B1 | 11/2001 | Gleichauf et al. | 2002/0087882 | A1 | 7/2002 | Schneier et al. |
| 6,330,589 | B1 | 12/2001 | Kennedy | 2002/0095492 | A1 | 7/2002 | Kaashoek et al. |
| 6,347,374 | B1 | 2/2002 | Drake et al. | 2002/0112185 | A1 | 8/2002 | Hodges |
| 6,353,886 | B1 | 3/2002 | Howard et al. | 2002/0116627 | A1 | 8/2002 | Tarbotton et al. |
| 6,363,489 | B1 | 3/2002 | Comay et al. | 2002/0120853 | A1 | 8/2002 | Tyree |
| 6,370,648 | B1 | 4/2002 | Diep | 2002/0133365 | A1 | 9/2002 | Grey et al. |
| 6,373,950 | B1 | 4/2002 | Rowney | 2002/0138416 | A1 | 9/2002 | Lovejoy et al. |
| 6,385,655 | B1 | 5/2002 | Smith et al. | 2002/0138755 | A1 | 9/2002 | Ko |
| 6,393,465 | B2 | 5/2002 | Leeds | 2002/0138759 | A1 | 9/2002 | Dutta |
| 6,393,568 | B1 | 5/2002 | Ranger et al. | 2002/0138762 | A1 | 9/2002 | Horne |
| 6,405,318 | B1 | 6/2002 | Rowland | 2002/0143963 | A1 | 10/2002 | Converse et al. |
| 6,442,588 | B1 | 8/2002 | Clark et al. | 2002/0147734 | A1 | 10/2002 | Shoup et al. |
| 6,442,686 | B1 | 8/2002 | McArdle et al. | 2002/0152399 | A1 | 10/2002 | Smith |
| 6,453,345 | B2 | 9/2002 | Trcka et al. | 2002/0165971 | A1 | 11/2002 | Baron |
| 6,460,141 | B1 | 10/2002 | Olden | 2002/0169954 | A1 | 11/2002 | Bandini et al. |
| 6,470,086 | B1 | 10/2002 | Smith | 2002/0172367 | A1 | 11/2002 | Mulder et al. |
| 6,487,599 | B1 | 11/2002 | Smith et al. | 2002/0178227 | A1 | 11/2002 | Matsa et al. |

| | | |
|---|---|---|
| 2002/0178383 A1 | 11/2002 | Hrabik et al. |
| 2002/0188864 A1 | 12/2002 | Jackson |
| 2002/0194469 A1 | 12/2002 | Dominique et al. |
| 2002/0199095 A1 | 12/2002 | Bandini et al. |
| 2003/0005326 A1 | 1/2003 | Flemming |
| 2003/0009554 A1 | 1/2003 | Burch et al. |
| 2003/0009693 A1 | 1/2003 | Brock et al. |
| 2003/0009696 A1 | 1/2003 | Bunker V et al. |
| 2003/0009699 A1 | 1/2003 | Gupta et al. |
| 2003/0014664 A1 | 1/2003 | Hentunen |
| 2003/0023692 A1 | 1/2003 | Moroo |
| 2003/0023695 A1 | 1/2003 | Kobata et al. |
| 2003/0023873 A1 | 1/2003 | Ben-Itzhak |
| 2003/0023874 A1 | 1/2003 | Prokupets et al. |
| 2003/0023875 A1 | 1/2003 | Hursey et al. |
| 2003/0028803 A1 | 2/2003 | Bunker V et al. |
| 2003/0033516 A1 | 2/2003 | Howard et al. |
| 2003/0033542 A1 | 2/2003 | Goseva-Popstojanova et al. |
| 2003/0041264 A1 | 2/2003 | Black et al. |
| 2003/0051026 A1 | 3/2003 | Carter et al. |
| 2003/0051163 A1 | 3/2003 | Bidaud |
| 2003/0051168 A1 | 3/2003 | King et al. |
| 2003/0055931 A1 | 3/2003 | Cravo De Almeida et al. |
| 2003/0061506 A1 | 3/2003 | Cooper et al. |
| 2003/0065943 A1 | 4/2003 | Gels et al. |
| 2003/0084280 A1 | 5/2003 | Bryan et al. |
| 2003/0084320 A1 | 5/2003 | Tarquini et al. |
| 2003/0084323 A1 | 5/2003 | Gales |
| 2003/0084347 A1 | 5/2003 | Luzzatto |
| 2003/0088792 A1 | 5/2003 | Card et al. |
| 2003/0093667 A1 | 5/2003 | Dutta et al. |
| 2003/0093695 A1 | 5/2003 | Dutta |
| 2003/0093696 A1 | 5/2003 | Sugimoto |
| 2003/0095555 A1 | 5/2003 | McNamara et al. |
| 2003/0097439 A1 | 5/2003 | Strayer et al. |
| 2003/0097564 A1 | 5/2003 | Tewari et al. |
| 2003/0105976 A1 | 6/2003 | Copeland, III |
| 2003/0110392 A1 | 6/2003 | Aucsmith et al. |
| 2003/0110396 A1 | 6/2003 | Lewis et al. |
| 2003/0115485 A1 | 6/2003 | Milliken |
| 2003/0115486 A1 | 6/2003 | Choi et al. |
| 2003/0123665 A1 | 7/2003 | Dunstan et al. |
| 2003/0126464 A1 | 7/2003 | McDaniel et al. |
| 2003/0126472 A1 | 7/2003 | Banzhof |
| 2003/0135749 A1 | 7/2003 | Gales et al. |
| 2003/0140137 A1 | 7/2003 | Joiner et al. |
| 2003/0140250 A1 | 7/2003 | Taninaka et al. |
| 2003/0145212 A1 | 7/2003 | Crumly |
| 2003/0145225 A1 | 7/2003 | Bruton, III et al. |
| 2003/0145226 A1 | 7/2003 | Bruton, III et al. |
| 2003/0149887 A1 | 8/2003 | Yadav |
| 2003/0149888 A1 | 8/2003 | Yadav |
| 2003/0154393 A1 | 8/2003 | Young |
| 2003/0154399 A1 | 8/2003 | Zuk et al. |
| 2003/0154402 A1 | 8/2003 | Pandit et al. |
| 2003/0158905 A1 | 8/2003 | Petry et al. |
| 2003/0159069 A1 | 8/2003 | Choi et al. |
| 2003/0159070 A1 | 8/2003 | Mayer et al. |
| 2003/0167402 A1 | 9/2003 | Stolfo et al. |
| 2003/0172166 A1 | 9/2003 | Judge et al. |
| 2003/0172167 A1 | 9/2003 | Judge et al. |
| 2003/0172289 A1 | 9/2003 | Soppera |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2003/0187996 A1 | 10/2003 | Cardina et al. |
| 2003/0212791 A1 | 11/2003 | Pickup |
| 2003/0233328 A1 | 12/2003 | Scott et al. |
| 2004/0015554 A1 | 1/2004 | Wilson |
| 2004/0025044 A1 | 2/2004 | Day |
| 2004/0054886 A1 | 3/2004 | Dickinson et al. |

| | | |
|---|---|---|
| 2004/0058673 A1 | 3/2004 | Iriam et al. |
| 2004/0059811 A1 | 3/2004 | Sugauchi et al. |
| 2004/0088570 A1 | 5/2004 | Roberts et al. |
| 2004/0111531 A1 | 6/2004 | Staniford et al. |
| 2004/0139160 A1 | 7/2004 | Wallace et al. |
| 2004/0139334 A1 | 7/2004 | Wiseman |
| 2004/0177120 A1 | 9/2004 | Kirsch |
| 2004/0203589 A1 | 10/2004 | Wang et al. |
| 2004/0205135 A1 | 10/2004 | Hallam-Baker et al. |
| 2004/0267893 A1 | 12/2004 | Lin |
| 2005/0021738 A1 | 1/2005 | Goeller et al. |
| 2005/0052998 A1 | 3/2005 | Oliver et al. |
| 2005/0065810 A1 | 3/2005 | Bouron |
| 2005/0102366 A1 | 5/2005 | Kirsch |
| 2005/0193076 A1* | 9/2005 | Flury et al. .............. 709/206 |
| 2005/0262209 A1 | 11/2005 | Yu |
| 2005/0262210 A1 | 11/2005 | Yu |
| 2006/0036727 A1 | 2/2006 | Kurapati et al. |
| 2006/0042483 A1 | 3/2006 | Work et al. |
| 2006/0095404 A1 | 5/2006 | Adelman et al. |
| 2006/0123083 A1 | 6/2006 | Goutte et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0230039 A1 | 10/2006 | Shull et al. |
| 2006/0253458 A1 | 11/2006 | Dixon et al. |

FOREIGN PATENT DOCUMENTS

| | | |
|---|---|---|
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1271846 | 7/2005 |
| GB | 2271002 A | 3/1994 |
| JP | 18350870 | 12/2006 |
| KR | 2006-0012137 | 2/2006 |
| KR | 1020060041934 | 5/2006 |
| WO | WO 96/35994 A1 | 11/1996 |
| WO | WO 99/05814 A2 | 2/1999 |
| WO | WO 99/33188 A2 | 7/1999 |
| WO | WO 99/37066 A1 | 7/1999 |
| WO | WO 00/42748 A1 | 7/2000 |
| WO | WO 01/17165 A2 | 3/2001 |
| WO | WO 01/50691 A2 | 7/2001 |
| WO | WO 01/76181 A2 | 10/2001 |
| WO | WO 02/13469 A2 | 2/2002 |
| WO | WO 02/13489 A2 | 2/2002 |
| WO | WO 02/075547 A1 | 9/2002 |
| WO | WO 02/091706 A1 | 11/2002 |
| WO | WO 2004/061703 | 7/2004 |
| WO | WO 2004081734 | 9/2004 |
| WO | WO 2005116851 | 12/2005 |

OTHER PUBLICATIONS

Article entitled "A Comparison of Two Learning Algorithms for Text Categorization" by Lewis et al., in *Third Annual Symposium on Document Analysis and Information Retrieval*, Apr. 11-13, 1994, pp. 81-92.

Article entitled "Learning Limited Dependence Bayesian Classifiers" by Sahami, in *Proceedings of the Second International Conference on Knowledge Discovery and Data Mining*, 1996, pp. 335-338.

Article entitled "An Evaluation of Phrasal and Clustered Representations on a Text Categorization Task" by Lewis, in *15th Ann Int'l SIGIR*, Jun. 1992, pp. 37-50.

Book entitled *Machine Learning* by Mitchell, 1997, pp. 180-184.

Article entitled "Learning Rules that Classify E-mail" by Cohen, pp. 1-8. Date unknown.

Article entitled "Hierarchically classifying documents using very few words" by Koller et. al., in *Proceedings of the Fourteenth International Conference on Machine Learning*, 1997.
Article entitled "Classification of Text Documents" by Li et. al., in *The Computer Journal*, vol. 41, No. 8, 1998, pp. 537-546.
Article entitled "Issues when designing filters in messaging systems" by Palme et. al., in 19 *Computer Communications*, 1996, pp. 95-101.
Article entitled "Text Categorization with Support Vector Machines: Learning with Many Relevant Features" by Joachins in *Machine Learning: ECML*-98, Apr. 1998, pp. 1-14.
Article entitled "Hierarchical Bayesian Clustering for Automatic Text Classification" by Iwayama et al. in *Natural Language*, pp. 1322-1327. Date unknown.
Article entitled "Smokey: Automatic Recognition of Hostile Messages" by Spertus in *Innovative Applications* 1997, pp. 1058-1065.
Article entitled "A Comparison of Classifiers and Document Representations for the Routing Problem" by Schutze. Date unknown.
Article entitled "CAFE: A Conceptual Model for Managing Information in Electronic Mail" by Takkinen et al. in *Proc. 31st Annual Hawaii International Conference on System Sciences*, 1998, pp. 44-53.
Article entitled "A Comparative Study on Feature Selection in Text Categorization" by Yang et. al. Date unknown.
Article entitled "Spam!" by Cranor et. al. in *Communications of the ACM*, vol. 41, No. 8, Aug., 1998, pp. 74-83.
Article entitled "Sendmall and Spam" by LeFebvre in *Performance Computing*, Aug. 1998, pp. 55-58.
Article entitled "Implementing a Generalized Tool for Network Monitoring" by Ranum et. al. in *LISA XI*, Oct. 26-31, 1997, pp. 1-8.
Article entitled "Method for Automatic Contextual Transposition Upon Receipt of Item of Specified Criteria" printed Feb. 1994 in *IBM Technical Disclosure Bulletin*, vol. 37, No. 2B, p. 333.
Article entitled "Toward Optimal Feature Selection" by Koller et al., in *Machine Learning: Proc. of the Thirteenth International Conference*, 1996.
Website: Technical Focus—Products—Entegrity AssureAccess. www2.entegrity.com.
Website: Create Secure Internet Communication Channels—Atabok Homepage. www.atabok.com.
Website: ATABOK VCNMAIL™ Secure Email Solution—Atabok Related Produces. www.atabok.com.
Website: ATABOK VCN Auto-Exchange™—Atabok Related Produces. www.atabok.com.
Website: Controlling Digital Assets Is a Paramount Need for All Business—Atabok Related Produces. www.atabok.com.
Website: Control Your Confidential Communications with ATABOK—Atabok Related Produces. www.atabok.com.
Website: Entrust Entelligence—Entrust Homepage. www.entrust.com.
Website: E-mail Plug-in—Get Technical/Interoperability—Entrust Entelligence. www.entrust.com.
Website: E-mail Plug-in—Get Technical/System Requirements—Entrust Entelligence. www.entrust.com.
Website: E-mail Plug-in—Features and Benefits—Entrust Entelligence. www.entrust.com.
Website: Internet Filtering Software—Internet Manager Homepage. www.elronsw.com.
Website: ESKE—Email with Secure Key Exchange—ESKE. www.danu.ie.
Website: Terminet—ESKE. www.danu.ie.
Website: Baltimore Focus on e-Security—Baltimore Technologies. www.baltimore.com.
Website: Go Secure! for Microsoft Exchange—Products/Services—Verisign, Inc. www.verisign.com.
Article entitled "MIMEsweeper defuses virus network, 'net mail bombs" by Avery, in *Info World*, May 20, 1996, vol. 12, No. 21, p. N1.
Article entitled "Stomping out mail viruses" by Wilkerson, in *PC Week*, Jul. 15, 1996, p. N8.
Article entitled "Securing Electronic Mail Systems" by Serenelli et al., in *Communications-Fusing Command Control and Intelligence: MILCOM '92*, 1992, pp. 677-680.
Article entitled "Integralis' Minesweeper defuses E-mail bombs" by Kramer et. al., in *PC Week*, Mar. 18, 1996, p. N17-N23.
Article entitled "A Toolkit and Methods for Internet Firewalls" by Ranum et. al., in *Proc. of USENIX Summer 1994 Technical Conference*, Jun. 6-10, 1994, pp. 37-44.
Article entitled "Firewall Systems: The Next Generation" by McGhle, in *Integration Issues in Large Commercial Media Delivery Systems: Proc. of Spie—The International Society for Optical Engineering*, Oct. 23-24, 1995, pp. 270-281.
Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-14.
Article entitled "X Through the Firewall, and Other Application Relays" by Treese et. al. in *Proc. of the USENIX Summer 1993 Technical Conference*, Jun. 21-25, 1993, pp. 87-99.
Article entitled "Firewalls For Sale" by Bryan, in *BYTE*, Apr. 1995, pp. 99-104.
Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.
Article entitled "Safe Use of X Window System Protocol Across a Firewall" by Kahn, in *Proc. of the Fifth USENIX UNIX Security Symposium*, Jun. 5-7, 1995, pp. 105-116.
Article entitled "Automating the OSI to Internet Management Conversion Through the Use of an Object-Oriented Platform" by Pavlou et al., in *Proc. of the IFIP TC6/WG6,4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Memo entitled "SOCKS Protocol Version 5" by Leech et. al., in *Standards Track*, Mar. 1996, pp. 1-9.
Article entitled "Securing the Web: fire walls, proxy servers, and data driven attacks" by Farrow in *InfoWorld*, Jun. 19, 1995, vol. 17, No. 25, p. 103.

* cited by examiner

SYSTEMS AND METHODS FOR GRAPHICALLY DISPLAYING MESSAGING TRAFFIC

CROSS-REFERENCE TO RELATED APPLICATIONS

This application claims priority to and the benefit of U.S. application Ser. No. 11/173,941, entitled "MESSAGE PROFILING SYSTEMS AND METHODS," filed on Jul. 1, 2005, which is a continuation in part of, and claims priority to and benefit of U.S. application Ser. No. 11/142,943, entitled "SYSTEMS AND METHODS FOR CLASSIFICATION OF MESSAGING ENTITIES,"filed Jun. 2, 2005, both of which claim priority to and the benefit of U.S. Provisional Application Ser. No. 60/625,507, entitled "Classification of Messaging Entities," filed on Nov. 5, 2004, all of which are incorporated herein by reference.

This application is also a continuation-in-part of and claims priority to and the benefit of commonly assigned U.S. patent application Ser. No. 11/383,347, filed May 15, 2006, entitled "CONTENT-BASED POLICY COMPLIANCE SYSTEMS AND METHODS", which claims priority to U.S. patent application Ser. No. 60/736,121, filed Nov. 10, 2005, both of which are incorporated herein by reference.

This application is a continuation in part of and claims priority to and the benefit of commonly assigned U.S. patent application Ser. No. 11/218,689, entitled "SYSTEMS AND METHODS FOR ADAPTIVE MESSAGE INTERROGATION THROUGH MULTIPLE QUEUES," filed Sep. 2, 2005, which is a continuation of U.S. patent application Ser. No. 10/093,553, entitled "SYSTEMS AND METHODS FOR ADAPTIVE MESSAGE INTERROGATION THROUGH MULTIPLE QUEUES," filed Mar. 8, 2002, now U.S. Pat. No. 6,941,467, both of which are incorporated herein by reference. This application is also a continuation in part of and claims priority to and the benefit of commonly assigned U.S. patent application Ser. No. 10/094,211, entitled "SYSTEMS AND METHODS FOR ENHANCING ELECTRONIC COMMUNICATION SECURITY," and U.S. patent application Ser. No. 10/094,266, entitled "SYSTEMS AND METHODS FOR ANOMALY DETECTION IN PATTERNS OF MONITORED COMMUNICATIONS," both of which were filed on Mar. 8, 2002 and are hereby incorporated by reference.

This application is also a continuation in part of and claims priority to and the benefit of commonly assigned U.S. patent application Ser. No. 10/361,091, filed Feb. 7, 2003, entitled "SYSTEMS AND METHODS FOR MESSAGE THEREAT MANAGEMENT," U.S. patent application Ser. No. 10/373, 325, filed Feb. 24, 2003, entitled "SYSTEMS AND METHODS FOR UPSTREAM THREAT PUSHBACK," U.S. patent application Ser. No. 10/361,067, filed Feb. 7, 2003, entitled "SYSTEMS AND METHODS FOR AUTOMATED WHITELISTING IN MONITORED COMMUNICATIONS," and U.S. patent application Ser. No. 10/384,924, filed Mar. 6, 2003, entitled "SYSTEMS AND METHODS FOR SECURE COMMUNICATION DELIVERY." The entire disclosure of all of these applications is incorporated herein by reference.

This application is also related to co-pending U.S patent application Ser. No. 11/423,329 entitled "METHODS AND SYSTEMS FOR EXPOSING MESSAGING REPUTATION TO AN END USER," and U.S. patent application Ser. No. 11/423,313 entitled "SYSTEMS AND METHODS FOR IDENTIFY INC POTENTIALLY MALICIOUS MESSAGES," both filed on Jun. 9, 2006. The entire disclosure of each of these applications is incorporated herein by reference.

TECHNICAL FIELD

This disclosure relates to enhancing security associated with electronic communications, and more particularly, without limitation, this disclosure relates to computer-based systems and methods for mapping data traffic flow for a messaging system.

BACKGROUND

The Internet is a global network of connected computer networks. Over the last several years, the Internet has grown in significant measure. A large number of computers on the Internet provide information in various forms. Anyone with a computer connected to the Internet can potentially tap into this vast pool of information.

The information available via the Internet encompasses information available via a variety of types of application layer information servers such as SMTP (simple mail transfer protocol), POP3 (Post Office Protocol), Instant Messaging, GOPHER (REF 1436), WAIS, HTTP (Hypertext Transfer Protocol, RFC 2616) and FTP (file transfer protocol, RFC 1123).

One of the most wide spread method of providing information over the Internet is via the World Wide Web (the Web). The Web consists of a subset of the computers connected to the Interne; the computers in this subset run Hypertext Transfer Protocol (HTTP) serves (Web servers). Several extensions and modifications to HTTP have been proposed including, for example, an extension framework (RFC 2774) and authentication (RFC 2617). Information on the Internet can be accessed through the use of a Uniform Resource Identifier (URI, RFC 2396). A URI uniquely specifies the location of a particular piece of information on the Internet. A URI will typically be composed of several components. The first component typically designates the protocol by which the address piece of information is accessed (e.g., HTTP, GOPHER, etc.). This first component is separated from the remainder of the URI by a colon (':'). The remainder of the URI will depend upon the protocol component. Typically, the remainder designates a computer on the Internet by name, or by IP number, as well as a more specific designation of the location of the resource on the designated computer. For instance, a typical URI for an HTTP resource might be:

http://www.server.com/dir1/dir2/resource.htm where http is the protocol, www.server.com is the designated computer and /dir1/dir2/resource.htm designates the location of the resource on the designated computer. The term URI includes Uniform Resource Names (URN's) including URN's as defined according to RFC 2141.

Web servers host information in the form of Web pages; collectively the server and the information hosted are referred to as a Web site. A significant number of Web pages are encoded using the Hypertext Markup Language (HTML) although other encodings using eXtensible Markup Language (XML) or XHTML. The published specifications for these languages are incorporated by reference herein; such specifications are available form the World Wide Web Consortium and its Web site (http://www.w3c.org). Web pages in these formatting languages may include links to other web pages on the same web site or another. As will be known to those skilled in the art, web pages may be generated dynamically by a server by integrating a variety of elements into a formatted page prior to transmission to a web client. Web servers, and information servers of other types, await requests for the information from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

Electronic mail (e-mail) is another wide spread application using the Internet. A variety of protocols are often used for e-mail transmission, delivery and processing including SMTP and POP3 as discussed above. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent.

In addition, the IMAP protocol has evolved as an alternative to POP3 that supports more advanced interactions between e-mail servers and clients. This protocol is described in RFC 2060.

The various standards discussed above by reference to particular RFC's are hereby incorporated by reference herein for all purposes. These RFC's are available to the public through the IETF and can be retrieved from its website (http://www.ietf.org/rfc.html). The specified protocols are not intended to be limited to the specific RFC's quoted herein above but are intended to include extensions and revisions thereto. Such extensions and/or revisions may or may not be encompassed by current and/or future RFC's.

A host of e-mail server and client products have been developed in order to foster e-mail communication over the Internet. E-mail server software includes such products as sendmail-based servers, Microsoft Exchange, Lotus Notes Server, and Novell GroupWise; sendmail-based servers refer to a number of variations of servers originally based upon the sendmail program developed for the UNIX operating systems. A large number of e-mail clients have also been developed that allow a user to retrieve and view e-mail messages from a server; example products include Microsoft Outlook, Microsoft Outlook Express, Netscape Messenger, and Eudora. In addition, some e-mail servers, or e-mail servers in conjunction with a Web server, allow a Web browser to act as an e-mail client using the HTTP standard.

As the Internet has become more widely used, it has also created new risks for corporations. Breaches of computer security by hackers and intruders and the potential for compromising sensitive corporate information are a very real and serious threat. Organizations have deployed some or all of the following security technologies to protect their networks from Internet attacks:

Firewalls have been deployed at the perimeter of corporate networks. Firewalls act as gatekeepers and allow only authorized users to access a company network. Firewalls play an important role in controlling traffic into networks and are an important first step to provide Internet security.

Intrusion detection systems (IDS) are being deployed throughout corporate networks. While the firewall acts as a gatekeeper, IDS act like a video camera. IDS monitor network traffic for suspicious patterns of activity, and issue alerts when that activity is detected. IDS proactively monitor your network 24 hours a day in order to identify intruders within a corporate or other local network.

Firewall and IDS technologies have helped corporations to protect their networks and defend their corporate information assets. However, as use of these devices has become widespread, hackers have adapted and are now shifting their point-of-attack from the network to Internet applications. The most vulnerable applications are those that require a direct, "always-open" connection with the Internet such as web and e-mail. As a result, intruders are launching sophisticated attacks that target security holes within these applications.

Many corporations have installed a network firewall, as one measure in controlling the flow of traffic in and out of corporate computer networks, but when it comes to Internet application communications such as e-mail messages and Web requests and responses, corporations often allow employees to send and receive from or to anyone or anywhere inside or outside the company. This is done by opening a port, or hole in their firewall (typically, port 25 for e-mail and port 80 for Web), to allow the flow of traffic. Firewalls do not scrutinize traffic flowing through this port. This is similar to deploying a security guard at a company's entrance but allowing anyone who looks like a serviceman to enter the building. An intruder can pretend to be a serviceman, bypass the perimeter security, and compromise the serviced Internet application.

The security risks do not stop there. After taking over the mail server, it is relatively easy for the intruder to use it as a launch pad to compromise other business servers and steal critical business information. This information may include financial data, sales projections, customer pipelines, contract negotiations, legal matters, and operational documents. This kind of hacker attack on servers can cause immeasurable and irreparable losses to a business. interconnected world, applications such as e-mail serve as a transport for easily and widely spreading viruses. Viruses such as "I Love You" use the technique exploited by distributed Denial of Service (DDoS) attackers to mass propagate. Once the "I Love You" virus is received, the recipients's Microsoft Outlook sends emails carrying viruses to everyone in the Outlook address book. The "I Love You" virus infected millions of computers within a short time of its release. Trojan horses, such as Code Red use this same technique to propagate themselves. Viruses and Trojan horses can cause significant lost productivity due to down time and the loss of crucial data.

The Nimda worm simultaneously attacked both email and web applications. It propagated itself by creating and sending infectious email messages, infecting computers over the network and striking vulnerable Microsoft IIS Web servers, deployed on Exchange mail servers to provide web mail.

Most e-mail and Web requests and responses are sent in plain text today, making it just as exposed as a postcard. This includes the e-mail message, its header, and its attachments, or in a Web context, a user name and password and/or cookie information in an HTTP request. In addition, when you dial into an Internet Service Provider (ISP) to send or receive e-mail messages, the user ID and password are also sent in plain text, which can be snooped, copied, or altered. This can be done without leaving a trace, making it impossible to know whether a message has been compromised.

The following are additional security risks caused by Internet applications:

E-mail spamming consumes corporate resources and impacts productivity. Furthermore, spammers use a corporation's own mail servers for unauthorized email relay, making it appear as if the message is coming from that corporation.

E-mail and Web abuse, such as sending and receiving inappropriate messages and Web pages, are creating liabilities for corporations. Corporations are increasingly facing litigation for sexual harassment or slander due to e-mail their employees have sent or received.

Regulatory requirements such as the Health Insurance Portability and Accountability Act (HIPAA) and the Gramm-Leach-Bliley Act (regulating financial instructions) create liabilities for companies where confidential patient or client information may be exposed in e-mail and/or Web servers or communications including e-mails, Web pages and HTTP requests.

Using the "always open" port, a hacker can easily reach an appropriate Internet application server, exploit its vulnerabilities, and take over the server. This provides hackers easy access to information available to the server, often including sensitive and confidential information. The systems and methods according to this disclosure provide enhanced security for communications involved with such Internet applications requiring an "always-open" connection.

SUMMARY

The present disclosure is directed to systems and methods for graphically displaying messaging traffic. Systems and methods can include a system data store (SDS), a system processor and one or more interfaces to one or more communications networks over which electronic communications are transmitted and received. The processor includes processing elements for receiving electronic communications having headers, the headers containing source and destination addresses and parsing the source and destination addresses associated with the electronic communications. Additional processing elements can convert source and destination addresses into a geographical position, assemble statistical information based upon the source and destination addresses of the electronic communications received at the communications interface. The processing elements can further provide a graphical user interface component comprising a geographical information pane configured to display a geographical map to a user via a display device and a map generator to generate the geographical map for use by the graphical user interface based upon user input, the map generator being configured to overlay statistical information onto the geographical map to show traffic flow associated with source and destination addresses.

Methods for graphically displaying messaging traffic can include the steps of: receiving a plurality of electronic communications, the electronic communications having source and destination addresses associated with the communications; parsing the source and destination addresses associated with the electronic communications; converting the source and destination addresses into a geographical position; assembling statistical information based upon at least the source and destination addresses of at least a sample of electronic communications received at the communications interface; storing the statistical information in the system data store; generating a geographical map; displaying the geographical map to a user; and overlaying the geographical map with traffic information based upon the statistical information and geographical position associated with the statistical information The details of one or more embodiments of this disclosure are set forth in the accompanying drawings and the description below.

DESCRIPTION OF DRAWINGS

Like reference symbols in the various drawings indicate like elements.

DETAILED DESCRIPTION

Figure 1:
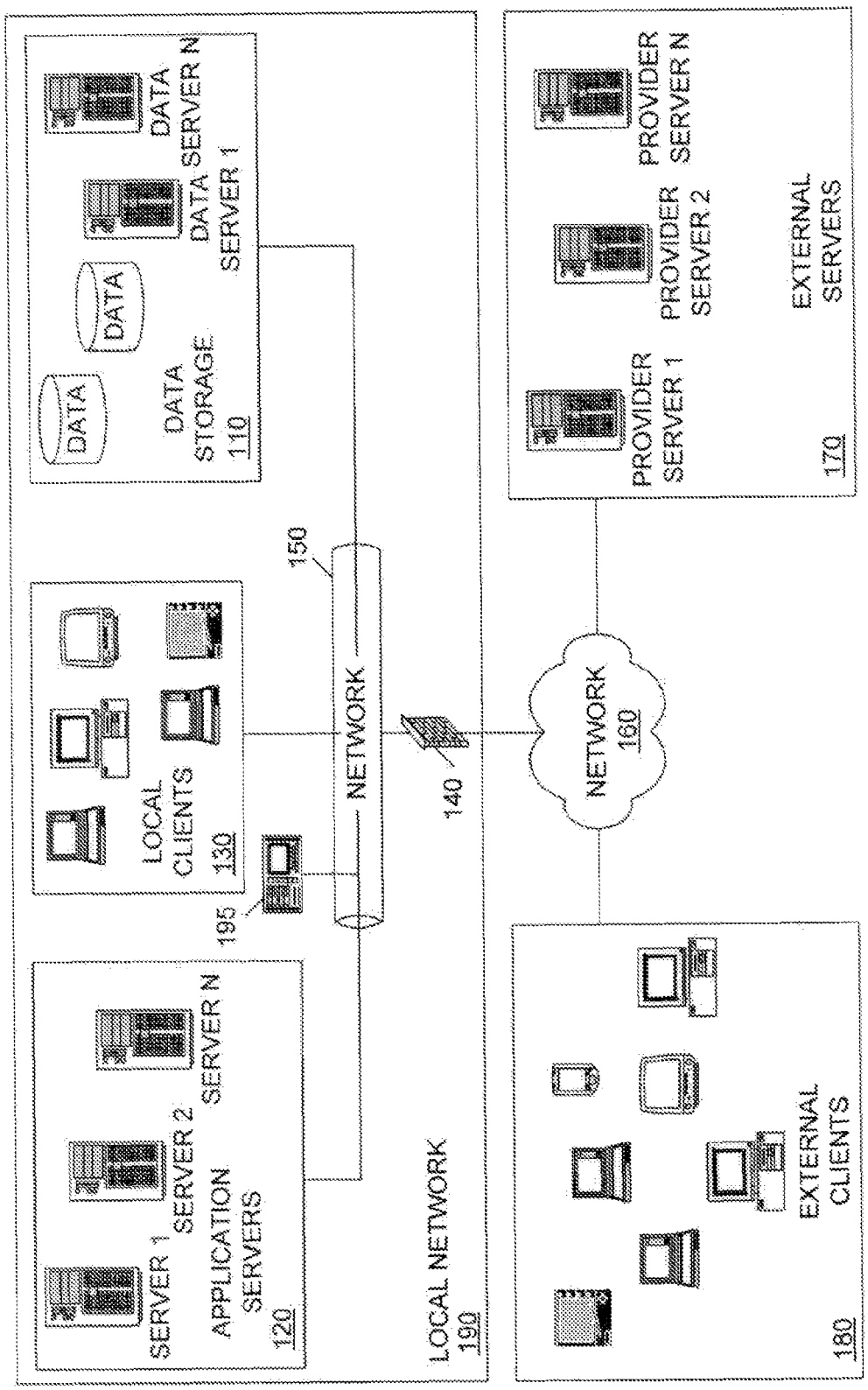
FIG. 1 is a depicts a hardware diagram for an environment using one preferred embodiment according to this disclosure.

Embodiments of this disclosure are now described in detail. Referring to the drawings, like numbers indicate like parts throughout the views. As used in the description herein and throughout the claims that follow, the meaning of "a,"

"an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

FIG. 1 depicts a typical environment according to this disclosure. The access environment using systems and methods according to this disclosure may include a hardware device 195 connected to a local communication network such as Ethernet 180 and logically interposed between firewall system 140, local servers 120 and clients 130. Application related electronic communications attempting to enter or leave the local communications network through the firewall system 140 are routed to the hardware device 195 for application level security assessment and/or anomaly detection. Hardware device 195 need not be physically separate from existing hardware elements managing the local communications network. For instance, the methods and systems according to this disclosure could be incorporated into a standard firewall system 140 or router (not shown) with equal facility. In environments not utilizing a firewall system, the hardware device 195 may still provide application level security assessment and/or anomaly detection.

For convenience and exemplary purposes only, the foregoing discussion makes reference to hardware device 195; however, those skilled in the art will understand that the hardware and/or software used to implement the systems and methods according to this disclosure may reside in other appropriate network management hardware and software elements. Moreover, hardware device 195 is depicted as a single element. In various embodiments, a multiplicity of actual hardware devices may be used. Multiple devices that provide security enhancement for application servers of a particular type such as e-mail instant messaging or web may be used where communications of the particular type are allocated among the multiple devices by an appropriate allocation strategy such as (1) serial assignment that assigns a communication to each device sequentially, or (2) via the use of a hardware and/or software load balancer that assigns a communication to the device based upon current device burden. A single device may provide enhanced security across multiple application server types, or each device may only provide enhanced security for a single application server type.

In one embodiment, hardware device 195 may be a rack-mounted Intel-based server at either 1U or 2U sizes. The hardware device 195 can be configured with redundant components such as power supplies, processors and disk arrays for high availability and scalability. The hardware device 195 may include SSL/TLS accelerators for enhanced performance of encrypted messages.

The hardware device 195 will include a system processor potentially including multiple processing elements where each processing element may be supported via Intel-compatible processor platforms preferably using at least one PENTIUM III or CELERON (Intel Corp., Santa Clara, Calif.) class processor; alternative processors such as UltraSPARC (Sun Microsystems, Palo Alto, Calif.) could be used in other embodiments. In some embodiments, security enhancement functionality, as further described below, may be distributed across multiple processing elements. The term processing element may refer to (1) a process running on a particular piece, or across particular pieces, of hardware, (2) a particular piece of hardware, or either (1) or (2) as the context allows.

The hardware device 195 would have an SDS that could include a variety of primary and secondary storage elements. In one preferred embodiment, the SDS would include RAM as at least part of the primary storage; the amount of RAM might range from 128 MB to several gigabytes although these amounts could vary and represent overlapping use such as where security enhancement according to this disclosure is integrated into a firewall system. The primary storage may in some embodiments consist of, or include in combination, other forms of memory such as cache memory, registers, non-volatile memory (e.g., FLASH, ROM, EPROM, etc.). etc.

The SDS may also include secondary storage including single, multiple and/or varied servers and storage elements. For example, the SDS may use internal storage devices connected to the system processor. In embodiments where a single processing element supports all of the security enhancement functionality, a local hard disk drive may serve as the secondary storage of the SDS, and a disk operating system executing on such a single processing element may act as a data server receiving and servicing data requests.

It will be understood by those skilled in the art that the different information used in the security enhancement processes and systems according to this disclosure may be logically or physically segregated within a single device serving as secondary storage for the SDS; multiple related data stores accessible through a unified management system, which together serve as the SDS; or multiple independent data stores individually accessible through disparate management systems, which may in some embodiments be collectively viewed as the SDS. The various storage elements that comprise the physical architecture of the SDS may be centrally located, or distributed across a variety of diverse locations.

The architecture of the secondary storage of the system data store may vary significantly in different embodiments. In several embodiments database(s) are used to store and manipulate the data; in some such embodiments, one or more relational database management systems, such as DB2 (IBM, White Plains, N.Y.), SQL Server (Microsoft, Redmond, Wash.), ACCESS(Microsoft, Redmond, Wash), ORACLE 8i (Oracle Corp., Redwood Shores, Calif.), Ingres (Computer Associated, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some embodiments, a tape library such as Exabyte X80 (Exabyte Corporation, Boulder, Colo.), a storage area network (SAN) solution such as available from (EMC, Inc., Hopkinton, Mass.), a network attached storage (NAS) solution such as NetApp Filer 740 (Network Appliances, Sunnyvale, Calif.), or combinations thereof may be used. In other embodiments, the data store may use database systems with other architectures such as object-oriented, spatial, object-relational or hierarchical or may use other storage implementations such as hash tables or flat files or combinations of such architectures. Such alternative approaches may use data servers other than database management systems such as a hash table look-up server, procedure and/or process and/or a flat file retrieval server, procedure and/or process. Further, the SDS may use a combination of any of such approaches in organizing its secondary storage architecture.

The hardware device 195 would have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant). In one preferred embodiment, the hardware device 195 includes a pre-loaded, pre-configured, and hardened UNIX operating system based upon FreeBSD (FreeBSD, Inc., http://www.freebsd.org). In this embodiment, the UNIX kernel has been vastly reduced, eliminating non-essential user accounts, unneeded network services, and any functionality that is not required for security enhancement processing. The operating system code has been significantly modified to eliminate security vulnerabilities.

Depending upon the hardware/operating system platform, appropriate server software may be included to support the desired access for the purpose of configuration, monitoring and/or reporting. Web server functionality may be provided via an Internet Information Server (Microsoft, Redmond, Wash.), an Apache HTTP Server (Apache Software Foundation, Forest Hill, Md.), an iPlanet Web Server (iPlanet E-Commerce Solutions—A Sun—Netscape Alliance, Mountain View, Calif.) or other suitable Web server platform. The e-mail services may be supported via an Exchange Server (Microsoft, Redmond, Wash.), sendmail or other suitable e-mail server. Some embodiments may include one or more automated voice response (AVR) systems that are in addition to, or instead of, the aforementioned access servers. Such an AVR system could support a purely voice/telephone driven interface to the environment with hard copy output delivered electronically to suitable hard copy output device (e.g., printer, facsimile, etc.), and forward as necessary through regular mail, courier, inter-office mail, facsimile or other suitable forwarding approach. In one preferred embodiment, an Apache server variant provides an interface for remotely configuring the hardware device 195. Configuration, monitoring, and/or reporting can be provided using some form of remote access device or software. In one embodiment, SNMP is used to configure and/or monitor the device. In one embodiment, any suitable remote client device is used to send and retrieve information and commands to/from the hardware device 195. Such a remote client device can be provided in the form of a Java client or a Windows-based client running on any suitable platform such as a conventional workstation or a handheld wireless device or a proprietary client running on an appropriate platform also including a conventional workstation or handheld wireless device.

Figure 2A:
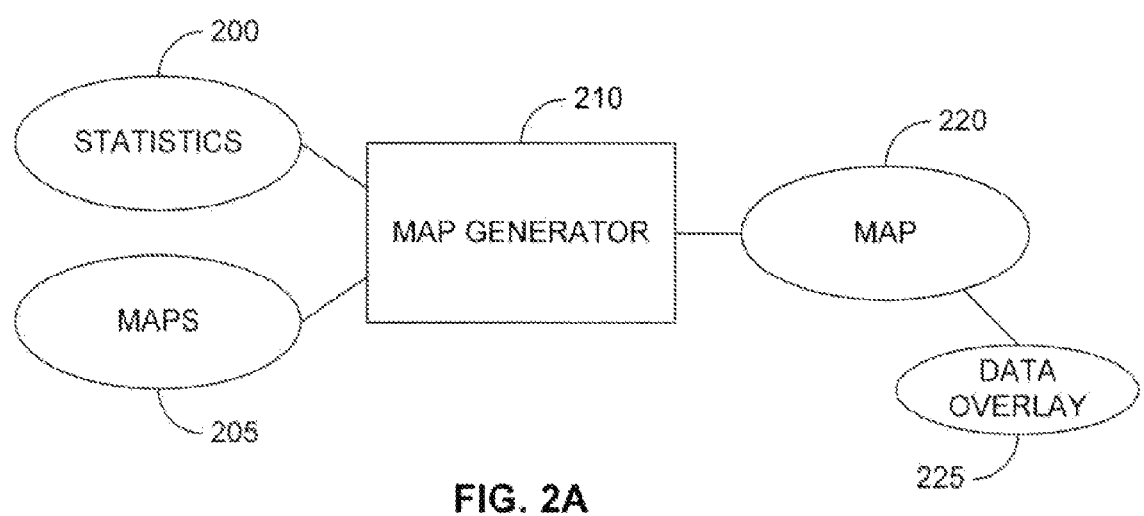
FIG. 2A is a block diagram depicting a system that has been configured to receive map data and statistics related to messaging traffic and provide a map with the overlayed messaging statistics.

FIG. 2A is block diagram depicting the generation of a geographical map having a messaging traffic overlay. Messaging statistics 200 and a maps database 205 are provided to a map generator 210. It should be understood that messages typically include internet protocol (IP) addresses, these addresses can therefore be assembled from the messages. The IP addresses can then be traced to a location associated with the message. As known to those skill in the art, software can be used to trace IP addresses to locations based upon known locations of registered IP addresses stored in associated databases. However, it should be understood that this disclosure is not intended to be limited to current location methods, but is intended to include all known methods for locating a computing device based upon its IP or media-access-control address. For example, in a wireless network, a computing device may be located through triangulation based on the signal strength received at more than one base station or access point. Enhanced 911 (e911) now allows mobile communications devices to be located in case of emergency. e911 can use a variety of techniques to locate a mobile communications device, and can include using a GPS signal alone or in combination with other techniques. Similarly, VoIP enhanced 911 is a geographic location system for packet switched voice, which is conceptually similar to any other packet switched data network.

Using the information provided the map generator 210 creates a map 220 for display to a user. The map includes an overlay of the data traffic flow 225, such that a system administrator can view the geographical locations from which traffic is being received, and to which traffic is being sent.

Figure 2B:
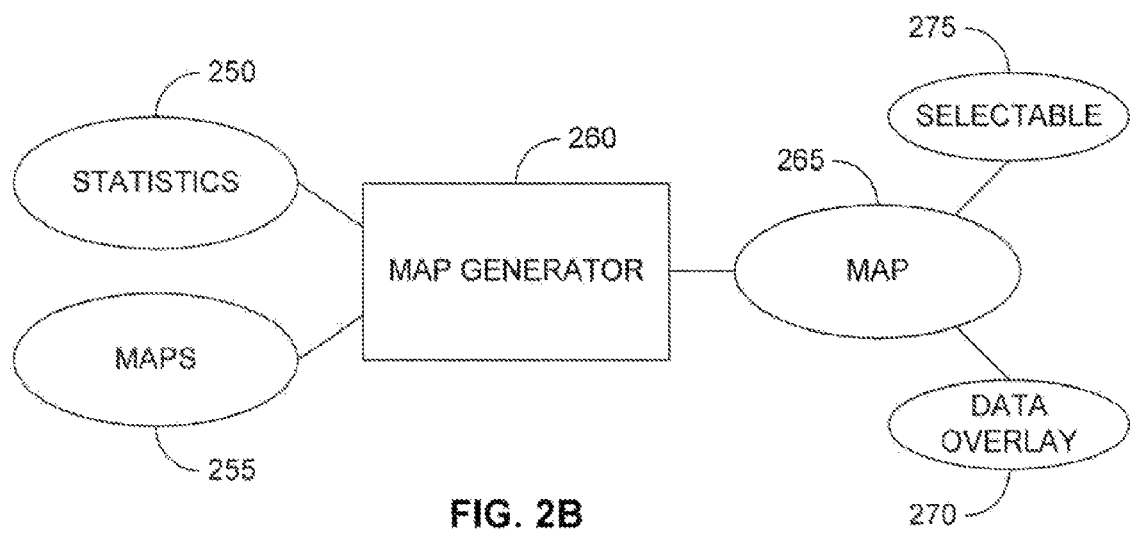
FIG. 2B is a block diagram depicting system that has been configured to receive map data and statistics related to messaging traffic and provide a user selectable map with a messaging statistics overlay.

FIG. 2B is a block diagram depicting a system for graphically displaying a map having a data traffic flow overlay. Messaging statistics 250 and a maps database 255 are provided to a map generator 260. The map generator 260 can generate a map 265 for display to a user based upon the input received from the messaging statistics 250 and the maps database 255. It should be understood that the map 265 can be generated based upon user input to a computing device. The map 265 includes an overlay of data traffic flow 270, thereby enabling a user to view the locations to which messaging data is being sent, and from which messaging data is being received. Moreover, the map 265 is selectable 275, thereby enabling a user to pan to different geographical locations, zoom in/zoom out to/from a location, zoom in/out to/from a particular traffic flow, such that a user can obtain a complete picture of messaging traffic.

With regard to zooming in to a traffic flow or zooming out from a traffic flow, it should be understood that in various systems and methods of this disclosure that messaging traffic can be isolated down to the message level, or at any abstraction therefrom, for example, traffic can be shown as flowing between states, between cities, between street address, among many others. Traffic can also be separated and displayed as, for example, incoming traffic, outgoing traffic, virus traffic, spam traffic, confidential traffic, personal traffic, encrypted traffic, among many other types of classifications, and combinations thereof. Additionally, in some examples, the types of attachments included in messages between endpoints may be displayed to a user. Types of attachments can be file types, such as, for example, images, binary, text documents, etc. Furthermore, the frequency with which messages travel between nodes can be provided to the user. For example, two addresses may exchange messages once a week, once a day, several times a day, several times an hour, etc.

The interface can be configured to turn on or off types of traffic being displayed. For example, if an administrator wants to view malicious traffic, the administrator might select to only display spam and virus traffic. Thus, it should be recognized that in some examples, the types of traffic displayed can be toggled on or off based upon user input.

Moreover, visualization of messaging traffic and statistical information can use visual cues such as color, size, shape, pattern, etc. In some examples, the visual cues are consistent between different views, queries, and/or sessions.

Figure 3:
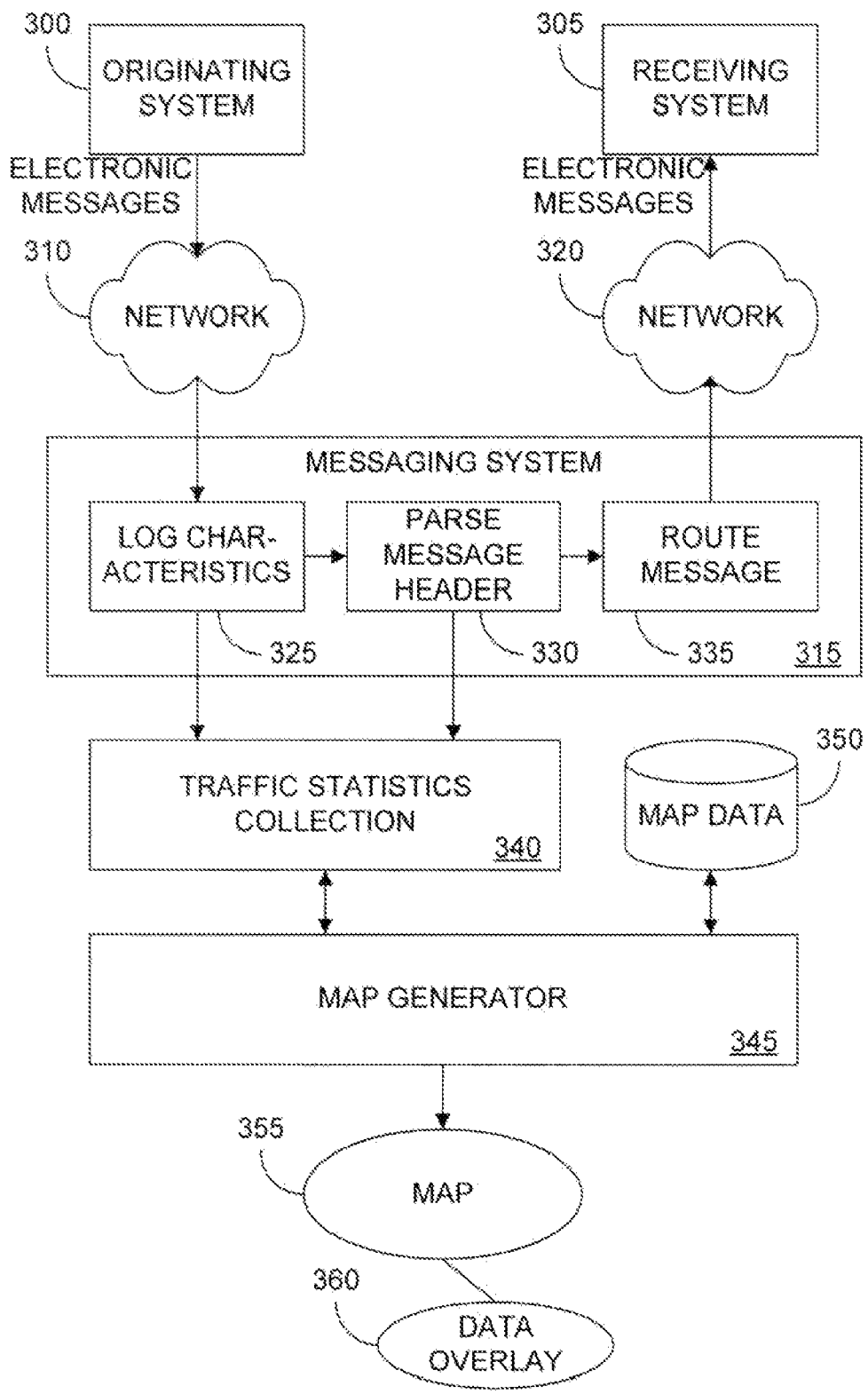
FIG. 3 is a block diagram depicting a system that has been configured to compile messaging traffic statistics and to generate a map based upon the messaging traffic statistics.

FIG. 3 depicts a system for collecting statistics from messaging traffic and generating maps using the collected messaging statistics. Messaging traffic can originate from a computing device 300 bound for a recipient device 305. Messaging traffic originating from computing device 300 typically passes through a network 310 before reaching some sort of messaging system 315. The messaging system then forwards the message to network 320 which routes the message to the receiving system 305. It should be understood that in various examples, networks 310 and 320 can comprise different networks, the same network or overlapping networks. Moreover, it should be understood that the sending an receiving systems often have different messaging systems, therefore depending on whether the messaging system is associated with the sender or receiver networks 310, 320 can include a messaging system for storage of electronic messages until they are delivered (e.g., downloaded) to the receiving system 305, or sometimes messages may be stored until deletion is requested by policy or by the receiving system 305. Further, it should be recognized that networks 310, 320 can take a variety of different forms, including public switched telephone networks (PSTN), local area networks (LANs), wide area networks (WANs), metropolitan area networks (MANs), intranets, extranets, among many others.

The messaging system 315 can perform a variety of functions, including a logging the characteristics 325 associated with the message. For example, the component could monitor any message characteristics, including, among others, message size, message content classification, intermediate systems through which the message has passed, and combinations thereof. The messaging system can further parse the message header 330 to determine source and destination addresses associated with the message, such that the messaging system can also route the message 335. As is known to those skilled in the art, the message header typically includes information about the originating system and receiving systems. Moreover, this information is not encrypted so that the messaging systems, and any intermediate routers, understand how to route the message to the recipient.

The message characteristics 325 and message header parsing 330 are sent to a traffic statistics collection system 340, which can be part of a system data store. Alternatively, the traffic statistics collection system could optionally include functionality to determine a location of IP or MAC addresses included in the message statistics, although it should be understood that this functionality could alternatively be embodied in the map generator 345.

The traffic statistics collection system 340 communicates with the map generator 345 to supply data related to a particular geographic location to the map generator 345. The map generator also communicates with a map database 350 to retrieve map data for the particular geographic location. The map generator 345 then uses the information received from the map database 350 and the traffic statistics collection system 345 to generate a map 355. The map 355 may be sent to a display device (not shown) for display to a user. The map 355 may further include a data overlay 360 depicting the traffic flow between the locations depicted on the map 355.

Figure 4:
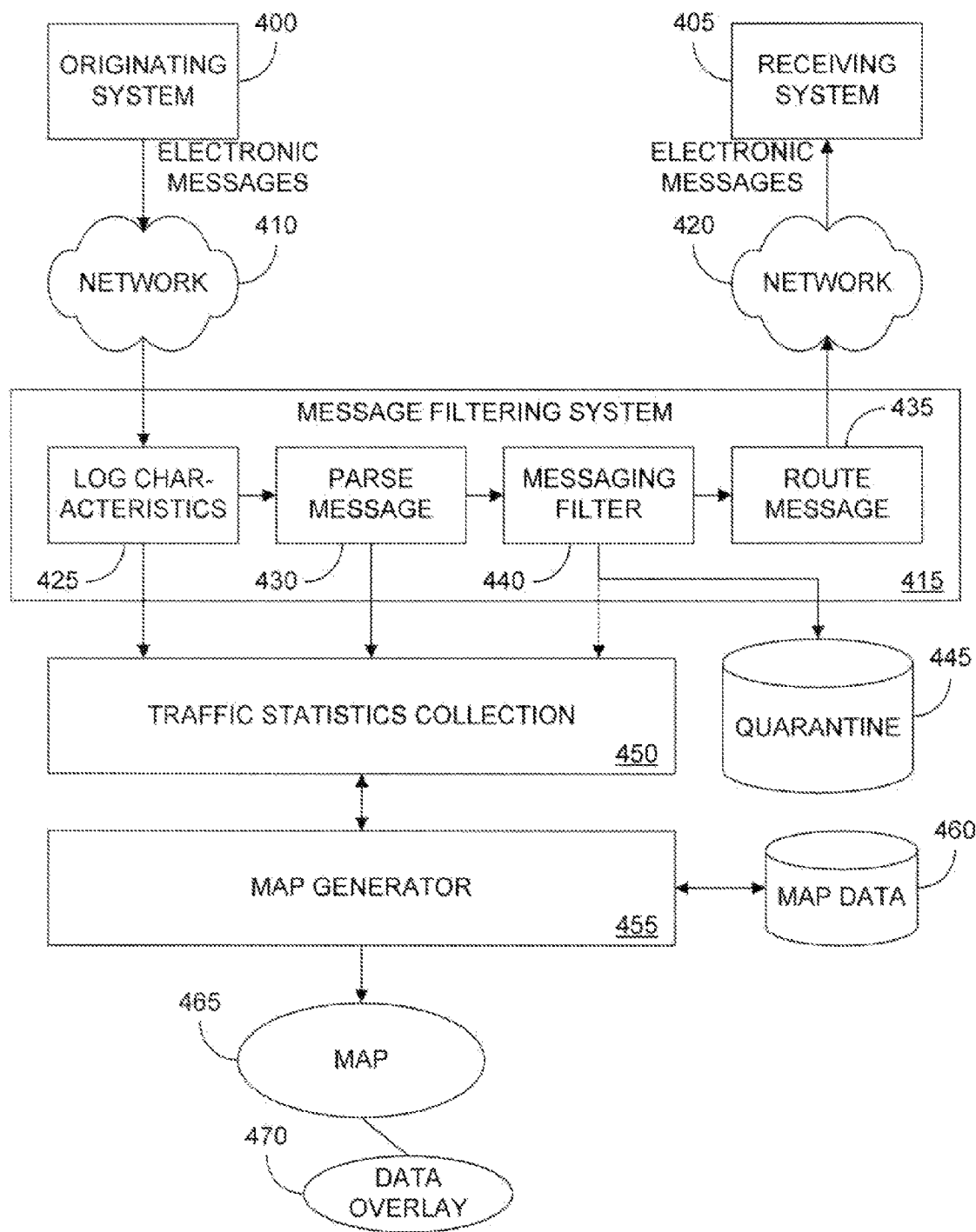
FIG. 4 is a block diagram depicting a system that has been configured to use an existing message filtering system to collect messaging traffic statistics used to generate a map based upon the messaging traffic statistics.

FIG. 4 depicts a system for collecting statistics from messaging traffic and generating maps using the collected messaging statistics. Messaging traffic can originate from a computing device 400 bound for a recipient device 405. Messaging traffic originating from computing device 400 typically passes through a network 410 before reaching some sort of messaging system 415. The messaging system then forwards the message to network 420 which routes the message to the receiving system 405. It should be understood that in various examples, networks 410 and 420 can comprise different networks, the same network or overlapping networks. Moreover, it should be understood that the sending an receiving systems often have different messaging systems, therefore depending on whether the messaging system is associated with the sender or receiver networks 410, 420 (or is associated with neither of the sender or receiver networks) can include a messaging system for storage of electronic messages until they are delivered (e.g., downloaded) to the receiving system 405, or sometimes messages may be stored until deletion is requested by policy or by the receiving system 405. Further, it should be recognized that networks 410, 420 can take a variety of different forms, including public switched telephone networks (PSTN), local area networks (LANs), wide area networks (WANs), metropolitan area networks (MANs), intranets, extranets, among many others.

The messaging system 415 can perform a variety of functions, including a logging the characteristics 425 associated with the message. For example, the component could monitor any message characteristics, including, among others, message size, message content classification, intermediate systems through which the message has passed, and combinations thereof. The messaging system can further parse the message header 430 to determine source and destination addresses associated with the message, such that the messaging system can also route the message 435. As is known to those skilled in the art, the message header typically includes information about the originating system and receiving systems. Moreover, this information is not encrypted so that the messaging systems, and any intermediate routers, understand how to route the message to the recipient.

The parsed message may also be used for message filtering 440. For example, a message may contain known spam, virus content, policy violation, security violation, etc., and combinations thereof. These messages may therefore be filtered by the messaging filter 440 to protect the receiving system. Messages that are filtered could be for example, sent to a quarantine 445, the messages could be dropped altogether, or the messages could be held for further analysis, among many others handling options for filtered messages.

The message characteristics 425, results of message header parsing 430, and results of message filtering 440 are sent to a traffic statistics collection system 450, which can be part of a system data store. Alternatively, the traffic statistics collection system could optionally include functionality to locate of IP or MAC addresses included in the message statistics, although it should be understood that this functionality could alternatively be embodied in the map generator 455.

The traffic statistics collection system 450 communicates with the map generator 455 to supply data related to a particular geographic location to the map generator 455. The map generator also communicates with a map database 460 to retrieve map data for the particular geographic location. The map generator 455 then uses the information received from the map database 460 and the traffic statistics collection system 455 to generate a map 465. The map 465 may be sent to a display device (not shown) for display to a user. The map 465 may further include a data overlay 470 depicting the traffic flow between the locations depicted on the map 465.

It should be understood from this disclosure that the traffic statistics collection system 455 may collect statistics from hundreds or thousands of messaging systems in various examples of this disclosure. Moreover, the traffic statistics collection system 455 in some examples can collect statistics from many unrelated nodes, and be operable to present statistics on any internet node based upon input from a user, such as an IP address. It should also be recognized that the traffic statistics collection system, in some examples, collects information related to different messaging and communication protocols and aggregates traffic across different platforms and protocols.

Figure 5:
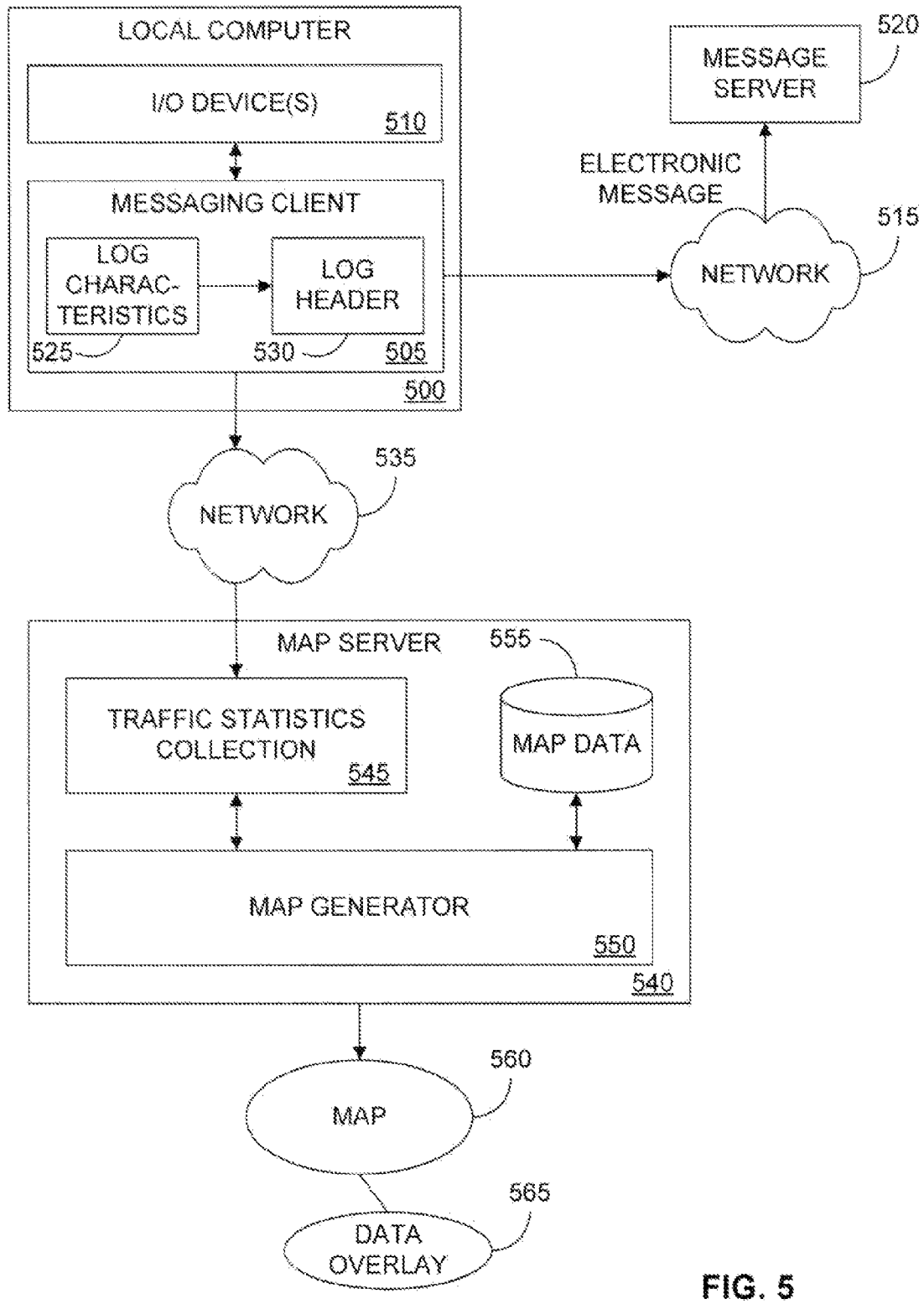
FIG. 5 is a block diagram depicting a system that has been configured to use a messaging client to collect messaging traffic statistics used to generate a map based upon the messaging traffic statistics.

FIG. 5 depicts a system for collecting statistics from messaging traffic and generating maps using the collected messaging statistics. Messaging traffic can originate from a computing device 500 bound for a recipient device (not shown). Messaging traffic originating from computing device 500 is typically composed using a messaging client 505 installed on the computing device via one or more I/O devices 510, passes through a network 515 before reaching some sort of messaging system 520. The messaging system then forwards the message to be routed to a receiving system (not shown). It should be understood that in various examples, the messaging client is the receiving system, and that it receives a message via the network 515 from the messaging server 520. Further, it should be recognized that networks 515 can take a variety of different forms, including public switched telephone networks (PSTN), local area networks (LANs), wide area networks (WANs), metropolitan area networks (MANs), intranets, extranets, among many others.

Systems and methods for collecting messaging statistics can use functionality included in a messaging client to log characteristics 525 of received/sent messages, and to log the header 530 of received/sent messages. The messaging client 505 can then send the messaging statistics to a map server 540 via a network 535. Again, it should be understood that networks 535 and 515 can be the same network, different networks, or overlapping networks, and can use myriad different architectures, protocols, and/or components, each of which is intended to be within the scope of this disclosure.

A map server 540 can include a traffic statistics collection system 545 to collect statistics received from the messaging client 505, as well as a map generator 550 and a map database 545. It should be understood that messaging statistics can be sent in real time as messages are sent/received, but that the messaging client 505 could also store statistics in volatile or non-volatile memory for transfer at regular intervals determined by a schedule, or at irregular intervals when usage of the computing device 500 is low.

The traffic statistics collection system 545 communicates with the map generator 540 to supply data related to a particular geographic location to the map generator 540. The map generator 550 also communicates with a map database 555 to retrieve map data for the particular geographic location. The map generator 550 then uses the information received from the map database 555 and the traffic statistics collection system 545 to generate a map 560. The map 550 may be sent to a display device (not shown) for display to a user. The map 560 may further include a data overlay 565 depicting the traffic flow between the locations depicted on the map 560. It should also be understood that the map server can be used as a central repository to graphically depict data traffic flow between a multitude of devices associated with and providing data to the map server 540. Moreover, it should be understood that the map server 540 in some examples could be used transmit a map 560 across a network to one or more remote users.

Figure 6:
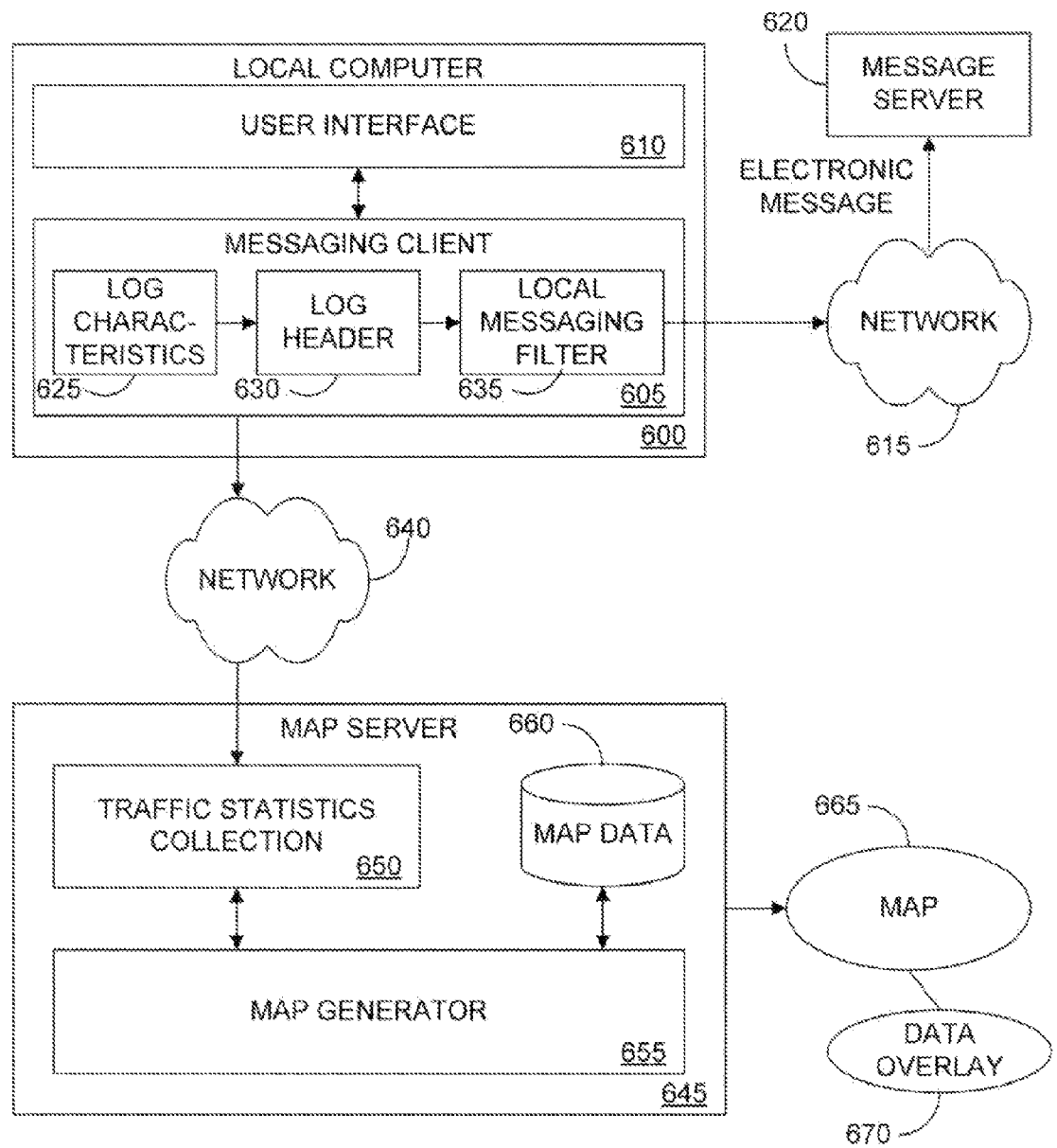
FIG. 6 is a block diagram depicting a system that has been configured to use a local messaging client having a messaging filter to collect messaging traffic statistics used to generate a map based upon the messaging traffic statistics.

FIG. 6 depicts systems and methods for collecting statistics from messaging traffic and generating maps using the collected messaging statistics. Messaging traffic can originate from a computing device 600 bound for a recipient device (not shown). Messaging traffic originating from computing device 600 is typically composed using a messaging client 605 installed on the computing device via one or more I/O devices 610. passes through a network 615 before reaching some sort of messaging system 620. The messaging system then forwards the message to be routed to a receiving system (not shown). It should be understood that in various examples, the messaging client is the receiving system, and that it receives a message via the network 615 from the messaging server 620. Further, it should be recognized that networks 615 can take a variety of different forms, including public switched telephone networks (PSTN), local area networks (LANs), wide area networks (WANs), metropolitan area networks (MANs), intranets, extranets, among many others.

Systems and methods for collecting messaging statistics can use functionality included in a messaging client to log characteristics 625 of received/sent messages and to log the header 630 of received/sent messages. It should also be understood that in some systems and methods, the message may be filtered by a local message filtering system 635. For example, a message may contain known spam, virus content, policy violation, security violation, etc., and combinations thereof. These messages may therefore be filtered by the local messaging filter 635 to protect the receiving and/or sending system. Messages that are filtered could be for example, sent to a quarantine, the messages could be dropped altogether, or the messages could be held for further analysis, among many other handling options for filtered messages.

The messaging client 605 can then send the messaging statistics (including the parsed header information, message characteristics, and classification, among others) to a map server 645 via a network 640. Again, it should be understood that networks 640 and 615 can be the same network, different networks, or overlapping networks, and can use myriad different architectures, protocols, and/or components, each of which is intended to be within the scope of this disclosure.

A map server 645 can include a traffic statistics collection system 650 to collect statistics received from the messaging client 605, as well as a map generator 655 and a map database 650. It should be understood that messaging statistics can be sent in real time as messages are sent/received, but that the messaging client 605 could also store statistics in volatile or non-volatile memory for transfer at regular intervals determined by a schedule, or at irregular intervals when usage of the computing device 600 is low. The traffic statistics collection system 650 in some examples can optionally include functionality to locate of IP or MAC addresses included in the message statistics, although it should be understood that this functionality could alternatively be embodied in the map generator 655.

The traffic statistics collection system 650 communicates with the map generator 645 to supply data related to a particular geographic location to the map generator 645. The map generator 655 also communicates with a map database 660 to retrieve map data for the particular geographic location. The map generator 655 then uses the information received from the map database 660 and the traffic statistics collection system 650 to generate a map 665. The map 665 may be sent to a display device (not shown) for display to a user. The map 665 may further include a data overlay 670 depicting the traffic flow between the locations depicted on the map 655. It should also be understood that the map server 645 can be used as a central repository to graphically depict data traffic flow between a multitude of devices associated with and providing data to the map server 645. Moreover, it should be understood that the map server 645 in some examples could be used transmit a map 665 across a network to one or more remote users.

Figure 7:
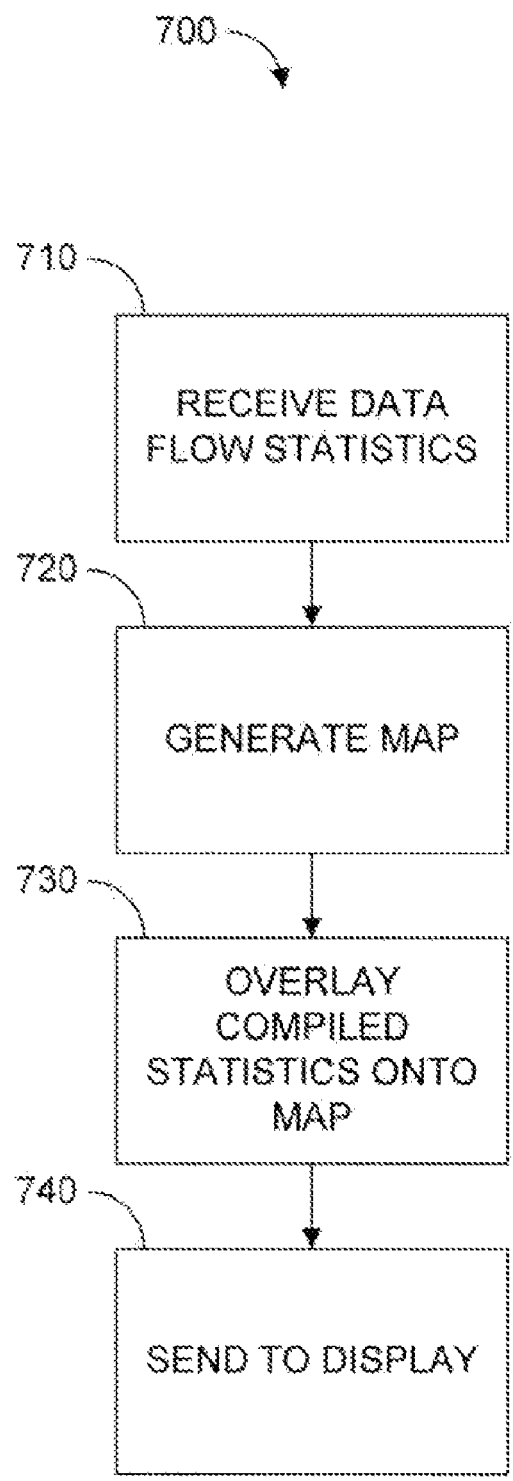
FIG. 7 is a flowchart depicting an operational scenario for generating a map showing messaging traffic flow.

FIG. 7 depicts an operational scenario 700 for systems and methods for graphically displaying messaging traffic. In step 710, the operational receives data flow statistics from some form of statistics collection and/or aggregation system. At step 720, the operational scenario generates a map based upon the received statistics. The operational scenario then overlays the generates map with the compiled statistics as shown in step 730. It should be understood that points on the map can be correlated with nodes associated with the data flow. For example, the node information can include latitude and longitude information in addition to data traffic associated with the various nodes identified by the data flow statistics. In step 740, the operational scenario sends the map with the traffic statistics overlay to a be displayed to a user.

Figure 8:
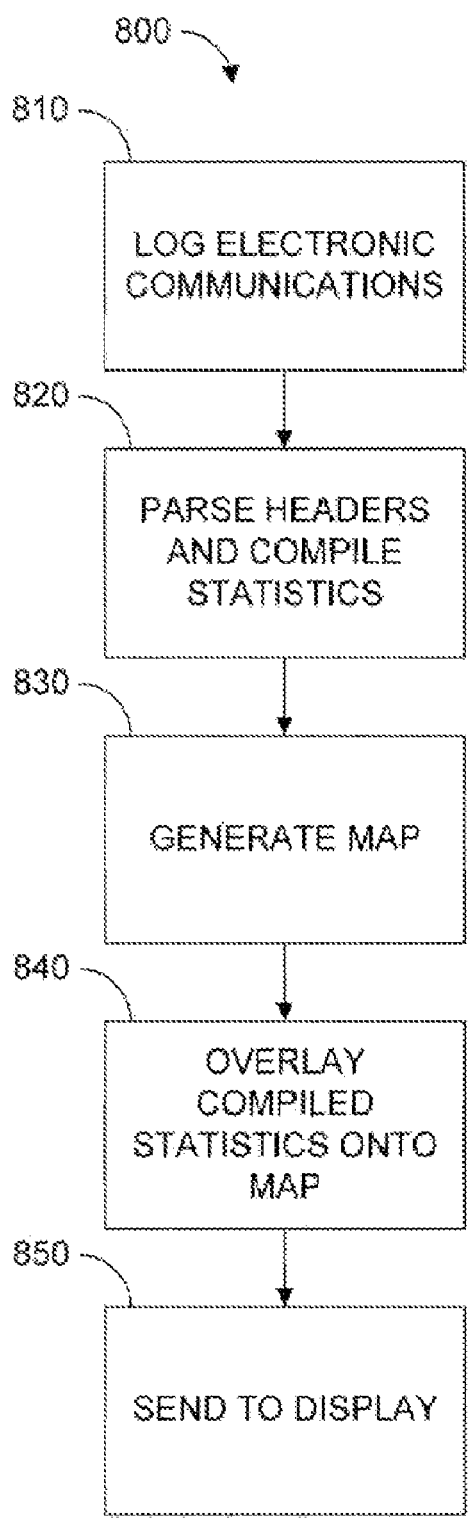
FIG. 8 is a flowchart depicting an operational scenario for gathering messaging traffic statistics and generating a map showing messaging traffic flow.

FIG. 8 depicts an operational scenario 800 for systems and methods for graphically displaying messaging traffic. In step 810, the operational scenario logs electronic communications. In some examples, the scenario could log only headers and other characteristics associated with the messages. At step 820, the operational scenario parses the headers of the messages and compiles statistics associated with the logged messages or message characteristics. The operational scenario then generates a map based upon the compiled statistics, as shown by step 830. At step 840, the operational scenario overlays the map using the compiled statistics. It should be understood that the compilation of statistics can be performed by a messaging system, by a messaging filtering system, by a messaging client, or by any other suitable mechanisms by which statistics can be collected regarding the data traffic flow. The operational scenario then sends the generated map to for display to a user, as shown by step 850.

Figure 9:
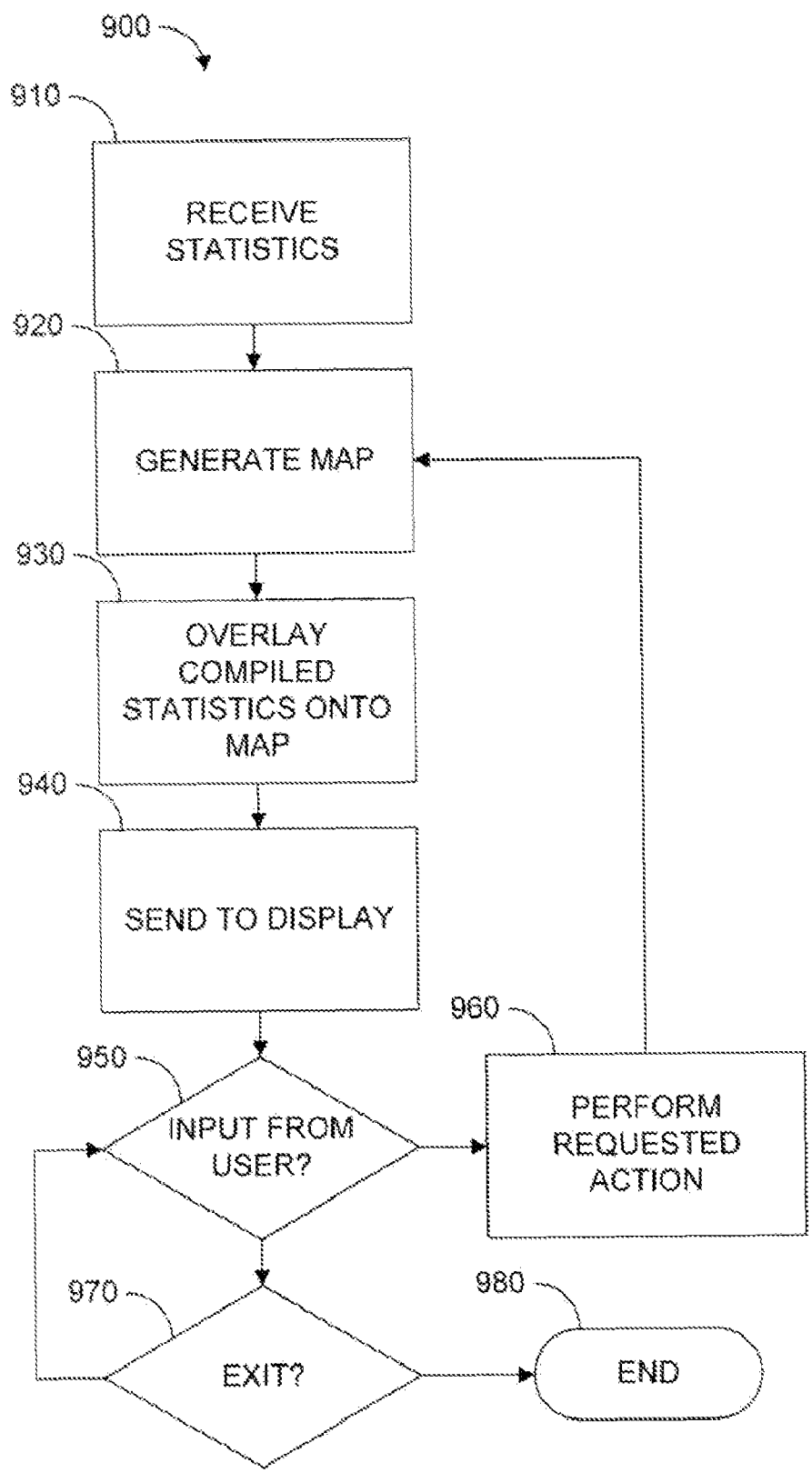
FIG. 9 is a flowchart depicting an operational scenario for generating an interactive map showing messaging traffic flow.

FIG. 9 depicts an operational scenario 900 for systems and methods for graphically displaying messaging traffic. In step 910, the operational receives data flow statistics from some form of statistics collection and/or aggregation system. It should be understood that in various example systems and methods that the statistics collection and/or aggregation system could also provide latitudinal and longitudinal information, or other information to assist in linking the statistics to a map. The operational scenario then generates a map based upon the compiled statistics, as shown by step 920. In various example systems and methods, the map generation can include a location system for using the addresses provided by the statistics collection and/or aggregation system to locate the nodes identified by the statistical information, and thereby use this information to link the statistics to the map. At step 930, the operational scenario overlays the map using the compiled statistics. It should be understood that the compilation of statistics can be performed by a messaging system, by a messaging filtering system, by a messaging client, or by any other suitable mechanisms by which statistics can be collected regarding the data traffic flow. The operational scenario then sends the generated map to for display to a user, as shown by step 940.

The operational scenario then determines whether input from the user has been received in step 950. If the operational scenario determines that input from the user has been received, the operational scenario instructs the map generation system to perform the action requested by the user. It should be understood that the action requested by the user can include, in various example systems an methods, zooming in on a location, zooming out from a location, zooming in on a traffic flow, zooming out on a traffic flow, separating traffic flows based upon the characteristics of individual data stream included in the traffic flow, combining individual streams to show an overall traffic flow, among many others. The operational scenario then returns to generate a map (920) and overlay compiled statistics onto the map (930) and send the map for display to a user (940), as shown by step 960.

If the operational scenario determines that no input from the user has been received in step 950, the operational scenario then determines whether an exit command has been received at step 970. If no exit command has been received, the operation scenario waits until it is determined that an exit command has been received or that an input form the user has been received. Upon determining that an exit command has been received from the user, the operational scenario ends at step 980.

Figure 10:
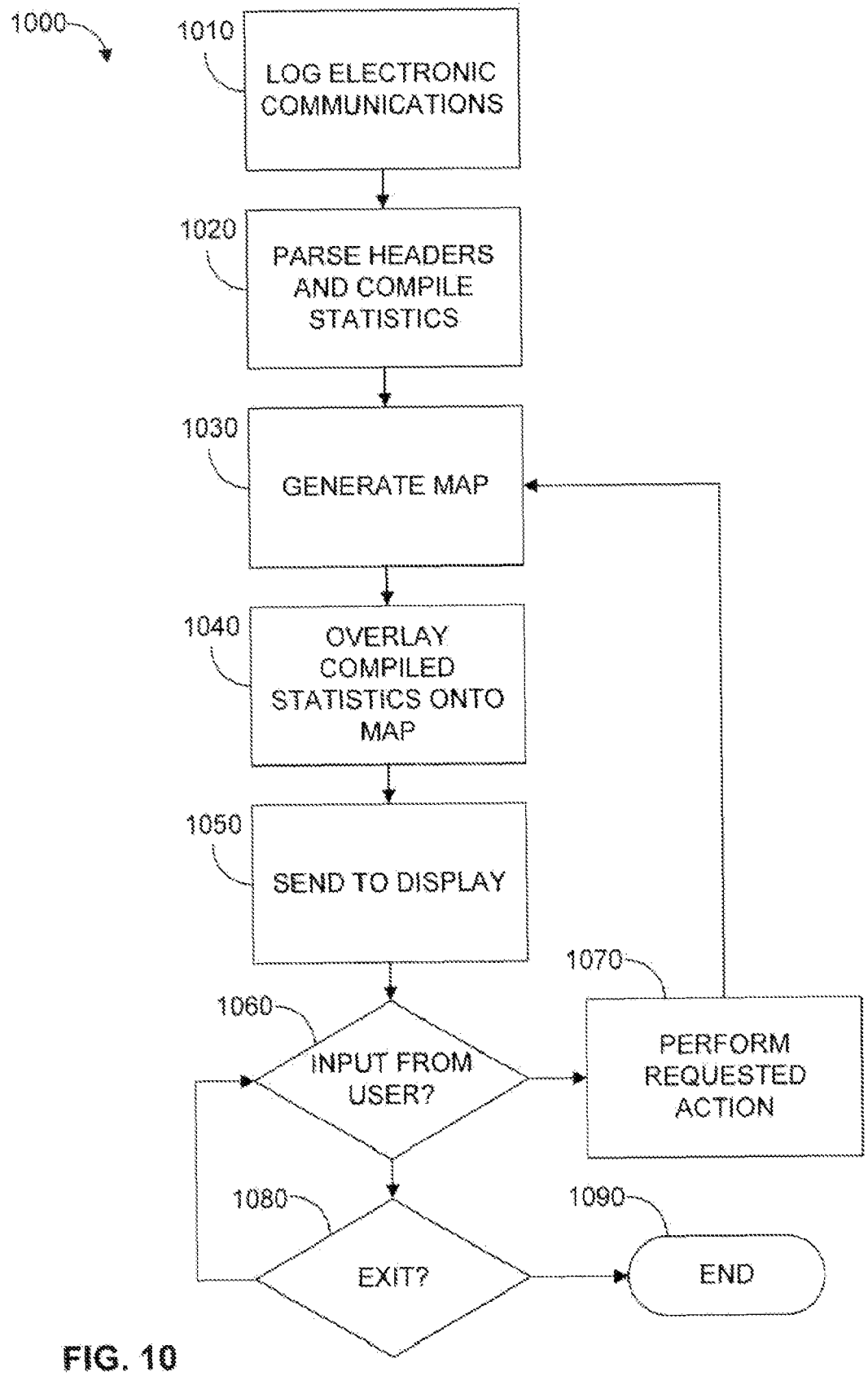
FIG. 10 is a flowchart depicting an operational scenario for gathering messaging traffic statistics and generating an interactive map showing messaging traffic flow.

FIG. 10 depicts an operational scenario 1000 for systems and methods for graphically displaying messaging traffic. In step 1010, the operational scenario logs electronic communications. In some examples, the scenario could log only headers and other characteristics associated with the messages. At step 1020, the operational scenario parses the headers of the messages and compiles statistics associated with the logged messages or message characteristics. It should be understood that in various example systems and methods that the statistics collection and/or aggregation system could also provide latitudinal and longitudinal information, or other information to assist in linking the statistics to a map. It should also be understood that the compilation of statistics can be performed by a messaging system, by a messaging filtering system, by a messaging client, or by any other suitable mechanisms by which statistics can be collected regarding the data traffic flow.

The operational scenario then generates a map based upon the compiled statistics, as shown by step 1030. In various example systems and methods, the map generation can include a location system for using the addresses provided by the statistics collection and/or aggregation system to locate the nodes identified by the statistical information, and thereby use this information to link the statistics to the map. At step 1040, the operational scenario overlays the map using the compiled statistics. It should b e understood that the compilation of statistics can be performed by a messaging system, by a messaging filtering system, by a messaging client, or by any other suitable mechanisms by which statistics can be collected regarding the data traffic flow. The operational scenario then sends the generated map to for display to a user, as shown by step 1050.

The operational scenario then determines whether input from the user has been received in step 1060. If the operational scenario determines that input from the user has been received, the operational scenario instructs the map generation system to perform the action requested by the user. It should be understood that the action requested by the user can include, in various example systems an methods, zooming in on a location, zooming out from a location, zooming in on a traffic flow, zooming out on a traffic flow, separating traffic flows based upon the characteristics of individual data stream included in the traffic flow, combining individual streams to show an overall traffic flow, among many others. The operational scenario then returns to generate a map (1030) and overlay compiled statistics onto the map (1040) and send the map for display to a user (1050), as shown by step 1070.

If the operational scenario determines that no input from the user has been received in step 1060, the operational scenario then determines whether an exit command has been received at step 1080. If no exit command has been received, the operation scenario waits until it is determined that an exit command has been received or that an input from the user has been received. Upon determining that an exit command has been received from the user, the operational scenario ends at step 1090.

Figure 11:
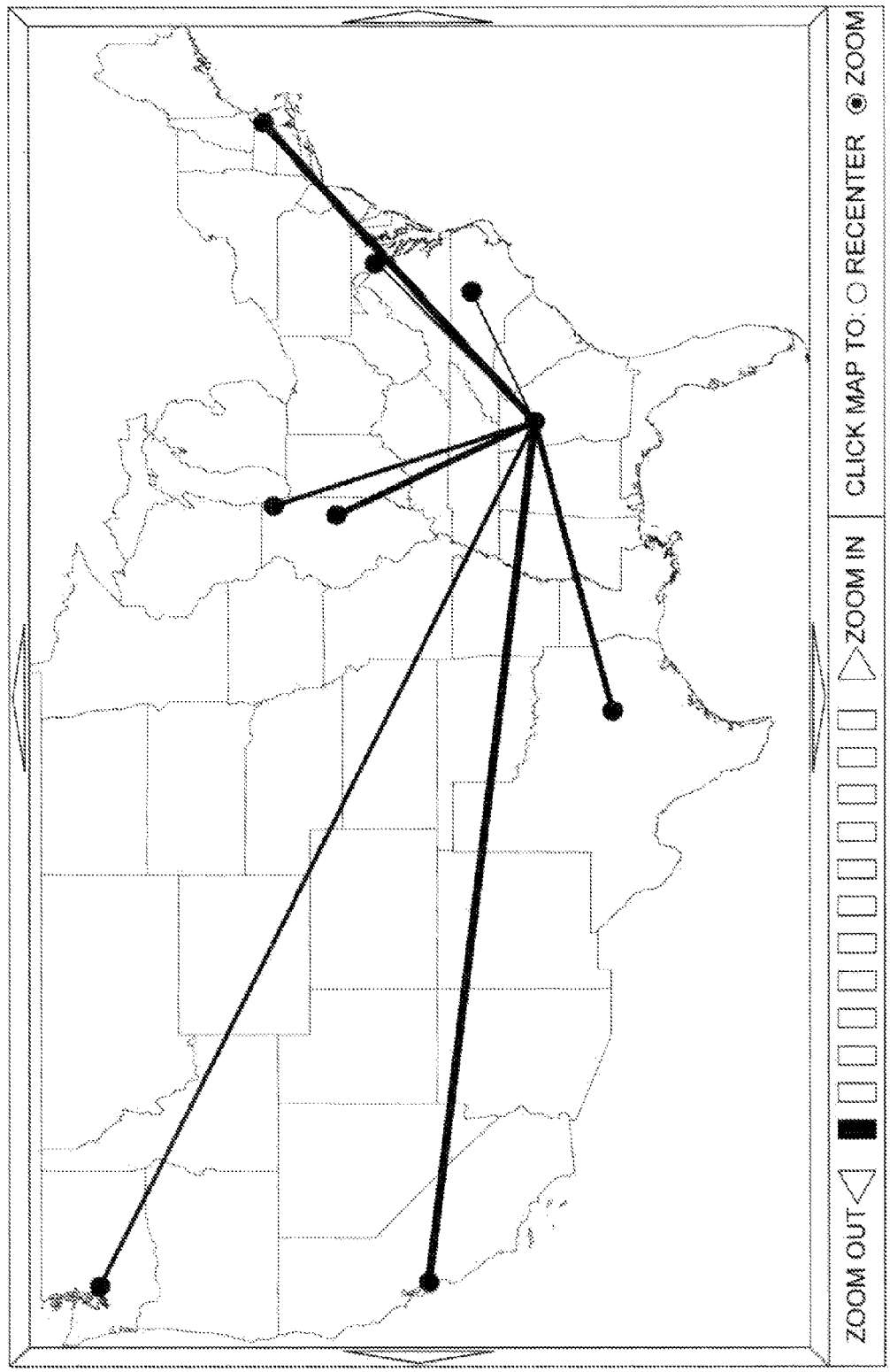
FIG. 11 depicts an example of a graphical user interface for a map pane in accordance with the present disclosure.

FIG. 11 depicts an example of an graphical user interface window representation 1100 upon which a user can view and interact with systems and methods of this disclosure. The graphical user interface window representation 1100 can depict in one example a map of the United States, including traffic flowing through a messaging system that is configured to supply statistics to a map generator. The graphical user interface window representation 1100 of this example shows hypothetical messaging traffic flowing through a messaging system in Atlanta, Ga. Moreover, the graphical user interface window representation 1100 can include some sort of notation indicating the level of traffic passing between the displayed nodes. In the example of graphical user interface window representation 1100, the level of traffic is indicated by the thickness of the line. However, it should be understood that there are other ways to depict the level of traffic. For example, among others, traffic level could be color coded using, for example, red, for high messaging traffic, green for average levels of traffic, and blue for low levels of traffic. It should be understood, however, that these are merely examples of ways to indicate messaging traffic levels, and that there are myriad other ways to indicate messaging traffic levels, each of which is intended to be included within the scope of the present disclosure. It should be noted that including every node with which the messaging system communicates can be done, however, the display of such information can be too busy. Some examples of systems and methods of this disclosure can obviate this problem by, for example, depicting states on the map in a color coded manner, to indicate a level of traffic coming from the entire state, rather than a particular node located within that state.

Figure 12:
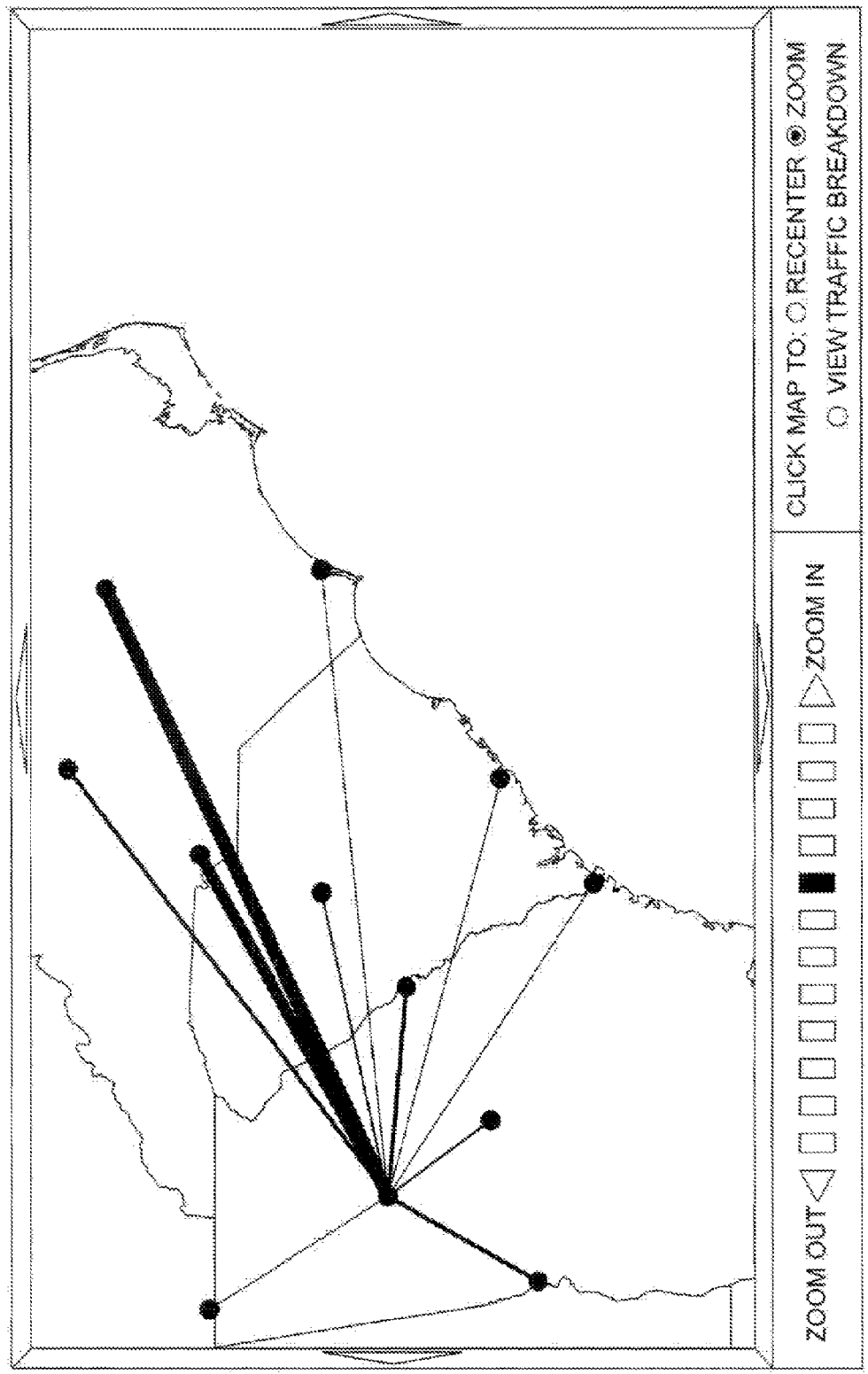
FIG. 12 depicts another example of a graphical user interface for a map pane in accordance with the present disclosure.

FIG. 12 depicts another example of an graphical user interface window representation 1200 which a user can utilize to view and interact with systems and methods of this disclosure. The graphical user interface window representation 1200 can depict in one example a map showing a regional breakdown of traffic, including traffic flowing through a messaging system that is configured to supply statistics to a map generator. The graphical user interface window representation 1200 of this example shows hypothetical messaging traffic flowing through a messaging system in Atlanta, Ga. to points located within the southeastern United States. Moreover, the graphical user interface window representation 1200 can include some sort of notation indicating the level of traffic passing between the displayed nodes. In the example of graphical user interface window representation 1200, the level of traffic is indicated by the thickness of the line. However, it should be understood that there are other ways to depict the level of traffic. For example, among others, traffic level could be color coded using, for example, red, for high messaging traffic, green for average levels of traffic, and blue for low levels of traffic. It should be understood, however, that these are merely examples of ways to indicate messaging traffic levels, and that there are myriad other ways to indicate messaging traffic levels, each of which is intended to be included within the scope of the present disclosure.

Figure 13:
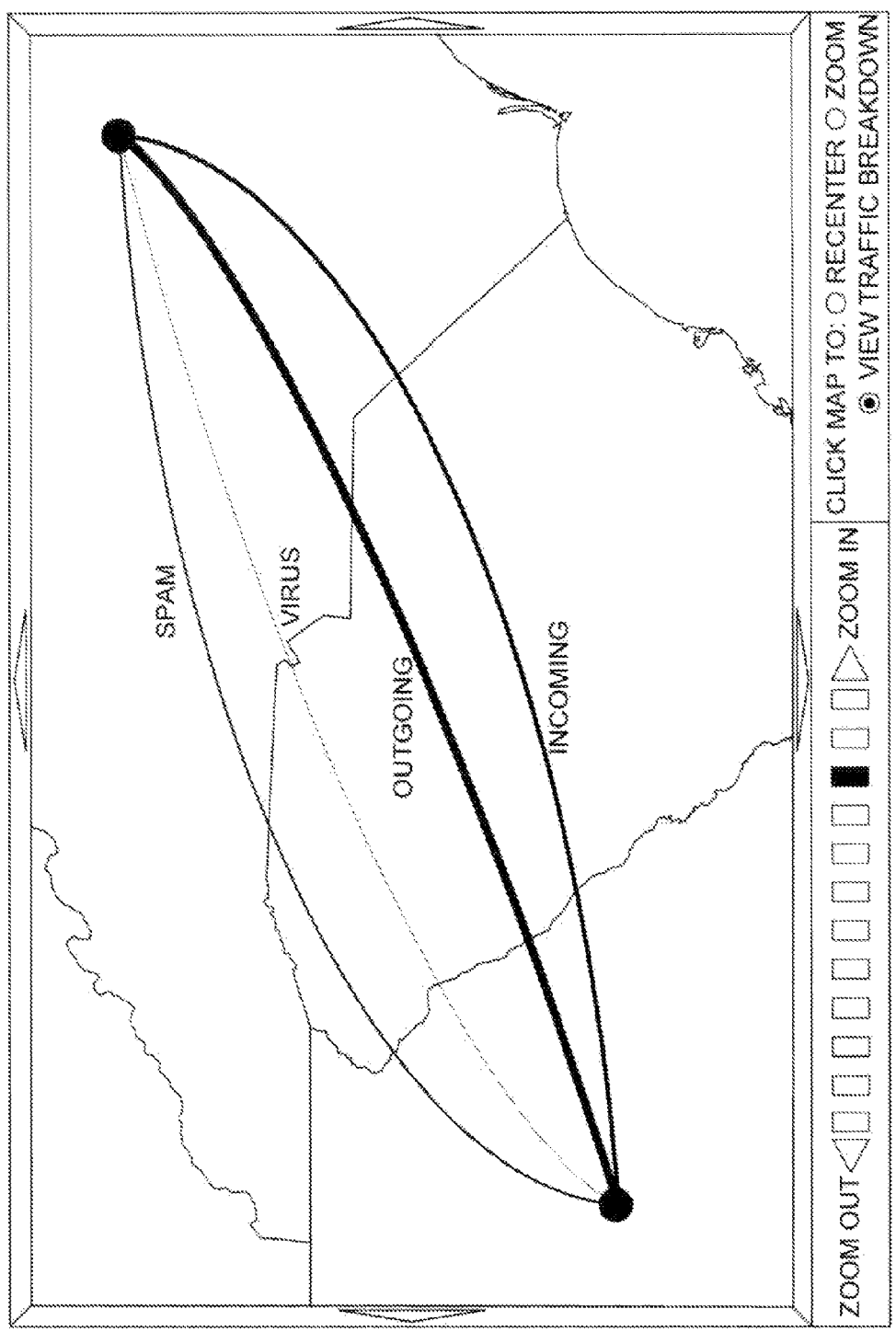
FIG. 13 depicts another example of a graphical user interface for a map pane in accordance with the present disclosure and showing types of traffic flowing between nodes.

FIG. 13 depicts another example of an graphical user interface window representation 1300 which a user can utilize to view and interact with systems and methods of this disclosure. The graphical user interface window representation 1300 can depict in one example a map showing a regional breakdown of traffic, including traffic flowing through a messaging system that is configured to supply statistics to a map generator. The graphical user interface window representation 1300 of this example shows hypothetical messaging traffic flowing through a messaging system in Atlanta, Ga. to points located within the southeastern United States. Further, the graphical user interface window representation 1300 depicts characteristics of the traffic flowing between Raleigh, N.C. and Atlanta, Ga. While traffic characteristics in this example show the types of traffic indicated as separated lines, in various other example systems and methods, the traffic could be color codes to represent the various types of traffic. Moreover, the graphical user interface window representation 1300 can include some sort of notation indicating the level of the traffic types passing between the displayed nodes. In the example of graphical user interface window representation 1300, the level of a traffic type is indicated by the thickness of the line. However, it should be understood that there are other ways to depict the level of a traffic type. For example, among others, traffic level could be color coded using, for example, red, for high messaging traffic, green for average levels of traffic, and blue for low levels of traffic. It should be understood, however, that these are merely examples of ways to indicate messaging traffic levels, and that there are myriad other ways to indicate messaging traffic levels, each of which is intended to be included within the scope of the present disclosure.

A number of embodiments of this disclosure have been described. Nevertheless, it will be understood that various modifications may be made without departing from the spirit and scope of the invention.

The invention claimed is:

1. A system configured to graphically display message traffic in a geographical context, the system comprising:
   a communications interface configured to link the system with an electronic communication network;
   a system data store configured to store statistical information related to electronic communications, data associated therewith, configuration data or combinations thereof;
   a system processor in communication with the interface, the system data store and endpoints, the system processor comprising one or more processing elements, wherein the one or more processing elements are programmed or adapted to:
      receive electronic communications having headers, the headers containing source and destination addresses;
      parse the source and destination addresses associated with the electronic communications;
      convert source and destination addresses into a geographical position;
      assemble statistical information based upon at least the source and destination addresses of at least a sample of electronic communications received at the communications interface, and to store the statistical information in the system data store;
   provide a graphical user interface component comprising a geographical information pane configured to display a geographical map to a user via a display device;
   a map generator configured to generate the geographical map interface for use by the graphical user interface based upon user input, the map generator being further configured to overlay statistical information onto the geographical map interface to show an electronic traffic flow associated with the source and destination addresses of at least the sample of electronic communications; and
   wherein the map generator is further operable to separate the electronic traffic flow between two nodes into multiple flows for display to the user, each flow characterizing a different classification of message content.

2. The system of claim 1, wherein the graphical user interface component is further configured to receive input from the user and communicate the input to the map generator, the map generator being configured to generate a new map for the map interface based upon the user input and send the new map to the graphical user interface component for display to the user.

3. The system of claim 2, wherein the input requests for the new map to focus on a particular portion of the geographical map.

4. The system of claim 3, wherein the input requests more information on a particular traffic flow displayed as part of the geographical map interface; wherein the map generator is further operable to provide more detailed focus upon a particular traffic flow based upon the user input.

5. The system of claim 4, wherein details about the particular traffic flow can be obtained by hovering over the traffic flow on a new map.

6. The system of claim 1, further comprising a message classification system configured to classify electronic communications and filter those electronic communications that violate at least one of a spam policy, a security policy, a virus policy, a compliance policy, an encryption policy, or combinations thereof.

7. The system of claim 6, wherein the statistical information assembled based upon the electronic communications includes statistics related to the classification of the electronic communications by the message classification system.

8. The system of claim 1, wherein each of the multiple traffic flows is color coded according to the classification of traffic it represents.

9. The system of claim 1, wherein the input from the user includes a specific point of origination or destination to display.

10. The system of claim 1, wherein the display is accompanied by an audio depiction associated with the geographical map or traffic flows.

11. The system of claim 7, wherein the map generator is further operable to display message classification statistics when a user hovers a mouse pointer representation over a particular traffic flow for which the message classification statistics are requested.

12. A method for graphically displaying data traffic in a geographical context, the method comprising:
receiving a plurality of electronic communications through a communication interface, the electronic communications having source and destination addresses associated with the communications;
parsing the source and destination addresses associated with the electronic communications;
converting the source and destination addresses into a geographical position;
assembling statistical information based upon at least the source and destination addresses of at least a sample of electronic communications received at the communications interface;
storing the statistical information in the system data store;
generating a geographical map interface;
displaying the geographical map interface to a user;
separating, using one or more processors, the electronic traffic flow between two nodes into multiple flows, each flow characterizing a different classification of message content; and
overlaying the geographical map interface with the multiple flows characterizing different classifications of messages and based upon the statistical information and geographical position associated with the statistical information.

13. The method of claim 12, further comprising the steps of:
receiving input from the user; and
adjusting the display based upon input from the user.

14. The method of claim 13, wherein adjusting the display comprises:
adjusting the boundaries of the geographical map based upon the input from the user;
displaying the adjusted geographical map to the user; and
overlaying the adjusted geographical map with traffic information based upon the statistical information and geographical position associate with the statistical information.

15. The method of claim 14, wherein adjusting the boundaries of the geographical map based upon the input from the user comprises zooming in on a selected portion of the map, the selected portion of the map being based upon the user input.

16. The method of claim 14, wherein adjusting the boundaries of the geographical map based upon input from the user comprises panning towards a selected portion of the geographical map, the selected portion of the map being based upon the user input.

17. The method of claim 13, wherein adjusting the display comprises zooming in on a selected traffic flow, the selected traffic flow comprising traffic between two nodes, and being based upon the user input.

18. The method of claim 17, wherein upon selection of a traffic flow, the selected traffic flow is separated into component parts, thereby enabling a user to review more detailed information about the selected traffic flow.

19. The method of claim 18, wherein a selected traffic flow comprises a plurality of traffic flow subsets related by a common component, and wherein the traffic flow subsets can be selected to reveal further subsets of traffic flow.

20. The method of claim 19, wherein the smallest level of granularity for selection is an individual electronic communication.

21. The method of claim 13, wherein the input from the user comprises hovering a mouse pointer representation over a selected traffic flow, and adjusting the display comprises displaying a dialog box representation showing statistics related to the selected traffic flow.

22. The method of claim 12, further comprising the step of receiving input from a user, wherein the generated map is based upon the input received from the user.

23. The method of claim 22, wherein the input received from the user specifies an internet protocol address, and the generated map and statistical information focuses on traffic involving the specified internet protocol address.

24. The method of claim 12, wherein the plurality of electronic communications comprise information collected from a plurality of sensors distributed on the Internet.

25. The method of claim 12, wherein the step of converting comprises using a location program to determine the physical location of an address.

26. The method of claim 12, further comprising:
receiving input from the user comprising one or more geographical or internet protocol addresses; and
retrieving statistic associated with the one or more geographical or internet protocol addresses input by the user;
wherein the geographical map and the overlay are based upon the one or more geographical or internet protocol addresses received from the user.

27. The system of claim 1, wherein the map generator separates at least one flow based on security concerns regarding the message content.

28. The method of claim 12, further comprising separating at least one flow based on security concerns regarding the message content.

* * * * *

UNITED STATES PATENT AND TRADEMARK OFFICE
CERTIFICATE OF CORRECTION

PATENT NO. : 7,693,947 B2  Page 1 of 1
APPLICATION NO. : 11/423308
DATED : April 6, 2010
INVENTOR(S) : Paul Judge et al.

It is certified that error appears in the above-identified patent and that said Letters Patent is hereby corrected as shown below:

In Column 1, Line 14, please delete "ENTITIES,"filed" and insert
-- ENTITIES," filed on --

In Column 1, Line 50, please delete "THEREAT" and insert -- THREAT --

In Column 1, Line 51, please delete "MANAGEMENT." and insert
-- MANAGEMENT," --

In Column 1, Line 67, please delete "IDENTIFY INC" and insert
-- IDENTIFYING --

In Column 20, Line 4 Claim 14, please delete "associate" and insert -- associated --

Signed and Sealed this

Thirteenth Day of July, 2010

David J. Kappos
*Director of the United States Patent and Trademark Office*